United States Patent
Avakian et al.

(10) Patent No.: US 11,698,219 B2
(45) Date of Patent: *Jul. 11, 2023

(54) SMART MOVABLE CLOSURE SYSTEM FOR COOLING CABINET

(71) Applicant: Cooler Screens Inc., Chicago, IL (US)

(72) Inventors: Arsen Avakian, Chicago, IL (US); Robert Edwin Dravenstott, Centennial, CO (US)

(73) Assignee: Cooler Screens Inc., Chicago, IL (US)

( * ) Notice: Subject to any disclaimer, the term of this patent is extended or adjusted under 35 U.S.C. 154(b) by 299 days.

This patent is subject to a terminal disclaimer.

(21) Appl. No.: 16/741,581

(22) Filed: Jan. 13, 2020

(65) Prior Publication Data

US 2020/0256612 A1 Aug. 13, 2020

Related U.S. Application Data

(63) Continuation-in-part of application No. PCT/US2019/066869, filed on Dec. 17, 2019, which
(Continued)

(51) Int. Cl.
*G06Q 30/00* (2023.01)
*F25D 23/02* (2006.01)
(Continued)

(52) U.S. Cl.
CPC ....... *F25D 23/028* (2013.01); *G06Q 30/0258* (2013.01); *G06Q 30/0261* (2013.01); *G06Q 30/0276* (2013.01); *F25D 2400/361* (2013.01)

(58) Field of Classification Search
None
See application file for complete search history.

(56) References Cited

U.S. PATENT DOCUMENTS

| 2,002,322 A | 5/1935 | Kraemer |
| 4,371,870 A | 2/1983 | Biferno |

(Continued)

FOREIGN PATENT DOCUMENTS

| CN | 102113033 B | 3/2014 |
| CN | 105513052 A * | 4/2016 |

(Continued)

OTHER PUBLICATIONS

Jun. 1, 2021—(TW) Notice of Allowance Application No. 108146270.
(Continued)

*Primary Examiner* — Michael Bekerman
(74) *Attorney, Agent, or Firm* — Banner & Witcoff, Ltd.

(57) ABSTRACT

A smart, movable closure system that allows access to the interior from the exterior of the cabinet, is disclosed. In some embodiments, the movable structure may be coupled with a cabinet interior that is adapted to be kept at a temperature cooler than the exterior cabinet ambient temperature, for example, to store perishable consumer goods in a retail setting. In particular, the smart, movable closure system may include electronic components that display graphical renderings corresponding to one or more products stored in the retail product container. In addition, the smart, movable closure system may include a controller that, before a user opts-in, generates an opt-in invitation at the smart, movable closure system, wherein the user may interface with the system with a wireless communication device.

20 Claims, 12 Drawing Sheets

Related U.S. Application Data is a continuation-in-part of application No. 16/222,643, filed on Dec. 17, 2018, now Pat. No. 10,769,666, and a continuation-in-part of application No. PCT/US2018/046103, filed on Aug. 9, 2018, and a continuation-in-part of application No. 15/674,198, filed on Aug. 10, 2017, now Pat. No. 10,672,032, said application No. PCT/US2018/046103 is a continuation-in-part of application No. 15/674,198, filed on Aug. 10, 2017, now Pat. No. 10,672,032.

(51) Int. Cl.
  *G06Q 30/0251* (2023.01)
  *G06Q 30/0241* (2023.01)

(56) References Cited

U.S. PATENT DOCUMENTS

| | | |
|---|---|---|
| 4,671,582 A | 6/1987 | Stromquist et al. |
| 4,893,902 A | 1/1990 | Baughman et al. |
| 4,998,382 A | 3/1991 | Kostos et al. |
| 5,024,023 A | 6/1991 | Kostos et al. |
| 5,111,618 A | 5/1992 | Kaspar et al. |
| 5,116,274 A | 5/1992 | Artwohl et al. |
| 5,255,473 A | 10/1993 | Kaspar et al. |
| 5,270,843 A | 12/1993 | Wang |
| 5,645,330 A | 7/1997 | Artwohl et al. |
| 6,005,652 A | 12/1999 | Matsuhira |
| 6,148,563 A | 11/2000 | Roche et al. |
| 6,377,228 B1 | 4/2002 | Jenkin et al. |
| 6,427,772 B1 | 8/2002 | Oden et al. |
| 6,475,087 B1 | 11/2002 | Cole |
| 6,476,885 B1 | 11/2002 | Murray et al. |
| 6,606,832 B2 | 8/2003 | Richardson et al. |
| 6,606,833 B2 | 8/2003 | Richardson et al. |
| 6,874,903 B2 | 4/2005 | Yang et al. |
| 7,072,096 B2 | 7/2006 | Holman et al. |
| 7,121,675 B2 | 10/2006 | Ter-Hovhannisian |
| 7,259,359 B2 | 8/2007 | Davey et al. |
| 7,290,707 B2 | 11/2007 | Sawasaki |
| 7,319,407 B2 | 1/2008 | Jang et al. |
| 7,377,125 B2 | 5/2008 | Seiden et al. |
| 7,413,233 B1 | 8/2008 | Jung |
| 7,513,637 B2 | 4/2009 | Kelly et al. |
| 7,593,867 B2 | 9/2009 | Deakin et al. |
| 7,824,056 B2 | 11/2010 | Madireddi et al. |
| 7,870,686 B2 | 1/2011 | Hines |
| 7,934,384 B2 | 5/2011 | Tuskiewicz et al. |
| 7,978,184 B2 | 7/2011 | Morrison |
| 8,009,864 B2 | 8/2011 | Linaker et al. |
| 8,189,855 B2 | 5/2012 | Opalach et al. |
| 8,219,438 B1 | 7/2012 | Moon et al. |
| 8,335,254 B1 | 12/2012 | Fernandez et al. |
| 8,468,059 B2 | 6/2013 | Enqvist |
| 8,630,924 B2 | 1/2014 | Groenevelt et al. |
| 8,672,427 B2 | 3/2014 | Hammonds |
| 8,683,745 B2 | 4/2014 | Artwohl et al. |
| 8,955,261 B2 | 2/2015 | Kobe et al. |
| 8,972,291 B2 | 3/2015 | Rimnac et al. |
| 9,046,294 B2 | 6/2015 | Lee et al. |
| 9,052,536 B2 | 6/2015 | Artwohl et al. |
| 9,098,825 B2 | 8/2015 | Bashkin |
| 9,144,328 B2 | 9/2015 | Seeley |
| 9,155,405 B2 | 10/2015 | Artwohl et al. |
| 9,230,386 B2 | 1/2016 | Roh et al. |
| 9,280,757 B2 | 3/2016 | Parpia et al. |
| 9,336,508 B2 | 5/2016 | Soon-Shiong |
| 9,349,238 B2 | 5/2016 | Tkachenko et al. |
| 9,361,628 B2 | 6/2016 | Stark |
| 9,504,338 B2 | 11/2016 | Artwohl et al. |
| 9,514,661 B2 | 12/2016 | Riegel |
| 9,524,419 B2 | 12/2016 | Chang |
| 9,560,777 B2 | 1/2017 | Krietzman et al. |
| 9,575,558 B2 | 2/2017 | Almen et al. |
| 9,689,603 B2 | 6/2017 | Roh et al. |
| 9,710,992 B2 | 7/2017 | Borra |
| 9,860,491 B2 | 1/2018 | Park et al. |
| 9,881,528 B2 | 1/2018 | Dunn |
| 9,911,377 B2 | 3/2018 | Howard et al. |
| 9,915,471 B2 | 3/2018 | Kim et al. |
| 9,959,568 B2 | 5/2018 | Klearman |
| 9,967,109 B2 | 5/2018 | Nishimura et al. |
| 9,972,284 B2 | 5/2018 | Lee et al. |
| 10,062,257 B2 | 8/2018 | Chau |
| 10,085,571 B2 | 10/2018 | Schiffman et al. |
| 10,089,520 B2 | 10/2018 | Motukuri et al. |
| 10,089,952 B2 | 10/2018 | Nam et al. |
| 10,122,915 B2 | 11/2018 | Maayan et al. |
| 10,126,849 B2 | 11/2018 | Lee et al. |
| 10,169,677 B1 | 1/2019 | Ren et al. |
| 10,258,170 B2 | 4/2019 | Dunn et al. |
| 10,282,695 B1 | 5/2019 | McNamara et al. |
| 10,304,417 B2 | 5/2019 | Park et al. |
| 10,360,571 B2 | 7/2019 | Garel et al. |
| 10,419,647 B2 | 9/2019 | Park et al. |
| 10,477,162 B2 | 11/2019 | Jain et al. |
| 10,514,722 B1 | 12/2019 | Artwohl et al. |
| 10,575,660 B2 | 3/2020 | Artwohl et al. |
| 10,580,333 B2 | 3/2020 | Artwohl et al. |
| 10,674,569 B2 | 6/2020 | Luckhardt et al. |
| RE48,115 E | 7/2020 | Artwohl et al. |
| 10,838,453 B2 | 11/2020 | Artwohl et al. |
| 10,937,344 B2 | 3/2021 | Artwohl et al. |
| 11,047,614 B2 * | 6/2021 | Kim ..................... A47F 3/0434 |
| 11,107,023 B2 * | 8/2021 | Glasgow .......... G06Q 10/06315 |
| 11,141,004 B1 | 10/2021 | Rolek |
| RE49,103 E | 6/2022 | Artwohl et al. |
| 11,419,434 B1 | 8/2022 | Artwohl et al. |
| 11,435,777 B2 | 9/2022 | Artwohl et al. |
| 11,450,247 B2 | 9/2022 | Artwohl et al. |
| 2001/0010516 A1 | 8/2001 | Roh et al. |
| 2001/0052741 A1 | 12/2001 | Yun |
| 2002/0007486 A1 | 1/2002 | Yun |
| 2003/0038912 A1 | 2/2003 | Broer et al. |
| 2003/0117790 A1 | 6/2003 | Lee et al. |
| 2003/0154141 A1 | 8/2003 | Capazario et al. |
| 2003/0205059 A1 | 11/2003 | Roche et al. |
| 2003/0207090 A1 | 11/2003 | Arora |
| 2003/0214619 A1 | 11/2003 | Masuda et al. |
| 2004/0073334 A1 | 4/2004 | Terranova |
| 2004/0093379 A1 | 5/2004 | Roh et al. |
| 2004/0144328 A1 | 7/2004 | Bonner et al. |
| 2004/0160388 A1 | 8/2004 | O'Keeffe |
| 2004/0194388 A1 | 10/2004 | Roche et al. |
| 2005/0068629 A1 | 3/2005 | Fernando et al. |
| 2005/0172654 A1 | 8/2005 | Rohrer et al. |
| 2005/0202178 A1 | 9/2005 | Roche et al. |
| 2005/0265019 A1 | 12/2005 | Sommers et al. |
| 2006/0103269 A1 | 5/2006 | Artwohl et al. |
| 2006/0127586 A1 | 6/2006 | Roche et al. |
| 2006/0145576 A1 | 7/2006 | Lee et al. |
| 2006/0158579 A1 | 7/2006 | Hasegawa |
| 2006/0174641 A1 | 8/2006 | Liu et al. |
| 2006/0192767 A1 | 8/2006 | Murakami |
| 2007/0003700 A1 | 1/2007 | Roche et al. |
| 2007/0016478 A1 | 1/2007 | Hill |
| 2007/0024822 A1 | 2/2007 | Cortenraad et al. |
| 2007/0058114 A1 | 3/2007 | Niiyama et al. |
| 2007/0076431 A1 | 4/2007 | Atarashi et al. |
| 2007/0151274 A1 | 7/2007 | Roche et al. |
| 2007/0162182 A1 | 7/2007 | Marti et al. |
| 2007/0171647 A1 | 7/2007 | Artwohl et al. |
| 2007/0193280 A1 | 8/2007 | Tuskiewicz et al. |
| 2007/0195535 A1 | 8/2007 | Artwohl et al. |
| 2007/0216657 A1 | 9/2007 | Konicek |
| 2008/0004950 A1 | 1/2008 | Huang et al. |
| 2008/0024047 A1 | 1/2008 | Juo et al. |
| 2008/0158858 A1 | 7/2008 | Madireddi et al. |
| 2009/0002990 A1 | 1/2009 | Becker et al. |
| 2009/0036208 A1 | 2/2009 | Pennington et al. |
| 2009/0052206 A1 | 2/2009 | Matsui et al. |
| 2009/0121970 A1 | 5/2009 | Ozbek |
| 2009/0146945 A1 | 6/2009 | Cho |

(56) References Cited

U.S. PATENT DOCUMENTS

| | | | |
|---|---|---|---|
| 2009/0276319 A1 | 11/2009 | Lungu et al. | |
| 2009/0295731 A1 | 12/2009 | Kim et al. | |
| 2009/0306820 A1 | 12/2009 | Simmons et al. | |
| 2009/0313125 A1 | 12/2009 | Roh et al. | |
| 2010/0013925 A1 | 1/2010 | Fowler et al. | |
| 2010/0026912 A1 | 2/2010 | Ho | |
| 2010/0043293 A1 | 2/2010 | Nicholson et al. | |
| 2010/0062152 A1 | 3/2010 | Roche et al. | |
| 2010/0068398 A1 | 3/2010 | Roche et al. | |
| 2010/0083672 A1 | 4/2010 | Yoon et al. | |
| 2010/0119705 A1 | 5/2010 | Roche et al. | |
| 2010/0152892 A1 | 6/2010 | Gavra et al. | |
| 2010/0180615 A1 | 7/2010 | Linder et al. | |
| 2010/0214786 A1 | 8/2010 | Nichol | |
| 2010/0268792 A1 | 10/2010 | Butler et al. | |
| 2010/0275477 A1 | 11/2010 | Kim | |
| 2010/0293827 A1 | 11/2010 | Suss et al. | |
| 2011/0022980 A1* | 1/2011 | Segal | G07F 9/023 |
| | | | 715/764 |
| 2011/0083460 A1 | 4/2011 | Thomas et al. | |
| 2011/0098849 A1 | 4/2011 | Hudis et al. | |
| 2011/0116231 A1 | 5/2011 | Dunn et al. | |
| 2011/0141011 A1 | 6/2011 | Lashina et al. | |
| 2011/0150276 A1 | 6/2011 | Eckhoff et al. | |
| 2011/0161160 A1* | 6/2011 | Carlson | G06F 3/013 |
| | | | 705/14.41 |
| 2011/0173082 A1 | 7/2011 | Breitenbach et al. | |
| 2011/0181792 A1 | 7/2011 | Hammonds | |
| 2011/0191154 A1 | 8/2011 | Johnson et al. | |
| 2012/0004769 A1 | 1/2012 | Hallenbeck et al. | |
| 2012/0105424 A1 | 5/2012 | Lee et al. | |
| 2012/0285089 A1* | 11/2012 | Artwohl | A47F 3/0434 |
| | | | 49/70 |
| 2012/0323620 A1 | 12/2012 | Hofman et al. | |
| 2013/0063326 A1 | 3/2013 | Riegel | |
| 2013/0271696 A1 | 10/2013 | Dunn | |
| 2013/0325638 A1 | 12/2013 | Auclair et al. | |
| 2014/0078407 A1 | 3/2014 | Green et al. | |
| 2014/0126829 A1 | 5/2014 | Seeley et al. | |
| 2014/0129354 A1 | 5/2014 | Soon-Shiong | |
| 2014/0129393 A1 | 5/2014 | Soon-Shiong | |
| 2014/0214547 A1* | 7/2014 | Signorelli | G06Q 30/0267 |
| | | | 705/14.64 |
| 2014/0232958 A1 | 8/2014 | Venturas et al. | |
| 2014/0316561 A1 | 10/2014 | Tkachenko et al. | |
| 2014/0344118 A1 | 11/2014 | Parpia et al. | |
| 2015/0002660 A1 | 1/2015 | Lee | |
| 2015/0073590 A1 | 3/2015 | Garcia Manchado et al. | |
| 2015/0178654 A1* | 6/2015 | Glasgow | G06Q 10/0875 |
| | | | 705/7.25 |
| 2016/0027231 A1 | 1/2016 | Guzzone et al. | |
| 2016/0040469 A1 | 2/2016 | Lietz et al. | |
| 2016/0047587 A1 | 2/2016 | Sasaki et al. | |
| 2016/0138860 A1 | 5/2016 | Kang | |
| 2016/0143459 A1 | 5/2016 | Clein | |
| 2016/0220039 A1 | 8/2016 | Chang et al. | |
| 2016/0350715 A1 | 12/2016 | Minvielle | |
| 2017/0027339 A1 | 2/2017 | Chang et al. | |
| 2017/0046991 A1 | 2/2017 | Riegel | |
| 2017/0124603 A1 | 5/2017 | Olson | |
| 2017/0147971 A1 | 5/2017 | Morse et al. | |
| 2017/0213184 A1* | 7/2017 | Lee | G06K 7/1443 |
| 2017/0228776 A1 | 8/2017 | Walden | |
| 2017/0329078 A1 | 11/2017 | Dunn et al. | |
| 2018/0020847 A1 | 1/2018 | Dunn et al. | |
| 2018/0053226 A1* | 2/2018 | Hutton | G06Q 20/202 |
| 2018/0061283 A1 | 3/2018 | Kim et al. | |
| 2018/0103778 A1 | 4/2018 | Olovsson | |
| 2018/0125404 A1* | 5/2018 | Bott | G06F 3/013 |
| 2018/0226056 A1 | 8/2018 | Chan | |
| 2018/0268367 A1 | 9/2018 | Bryan et al. | |
| 2018/0335252 A1 | 11/2018 | Oh | |
| 2018/0365630 A1 | 12/2018 | Seals et al. | |
| 2019/0050900 A1 | 2/2019 | Avakian | |
| 2019/0122263 A1 | 4/2019 | Avakian | |
| 2019/0149725 A1 | 5/2019 | Adato et al. | |
| 2019/0156273 A1 | 5/2019 | Fisher et al. | |
| 2019/0213545 A1 | 7/2019 | Adato et al. | |
| 2020/0286032 A1 | 9/2020 | Bogolea et al. | |

FOREIGN PATENT DOCUMENTS

| | | | |
|---|---|---|---|
| DE | 10205405 A1 | 8/2003 | |
| DE | 102009003127 A1 | 11/2010 | |
| DE | 102015203150 A1 * | 8/2016 | F25D 23/02 |
| EP | 2194222 A2 | 6/2010 | |
| EP | 2843336 A1 | 3/2015 | |
| EP | 3379184 A1 * | 9/2018 | F25D 23/021 |
| EP | 3740103 A1 | 11/2020 | |
| JP | 2001294308 A | 10/2001 | |
| JP | 2003125904 A | 5/2003 | |
| JP | 3450907 B2 | 9/2003 | |
| JP | 2004183987 A | 7/2004 | |
| JP | 2014206320 A | 10/2014 | |
| JP | 2015169412 A * | 9/2015 | |
| JP | 2015169412 A | 9/2015 | |
| JP | 2015222138 A * | 12/2015 | |
| KR | 20120044874 A | 5/2012 | |
| KR | 20150093289 A | 8/2015 | |
| KR | 20170033083 A | 3/2017 | |
| WO | 9838547 A1 | 9/1998 | |
| WO | WO-03025805 A1 * | 3/2003 | G06Q 10/087 |
| WO | 2009152078 A1 | 12/2009 | |
| WO | 2014175643 A1 | 10/2014 | |
| WO | WO-2015095493 A1 * | 6/2015 | G06Q 10/04 |
| WO | 2016183302 A1 | 11/2016 | |
| WO | 2017127035 A1 | 7/2017 | |
| WO | 2019032893 A1 | 2/2019 | |

OTHER PUBLICATIONS

Jun. 3, 2021—(TW) Search Report Application No. 108146270.
Jun. 1, 2021—(TW) Notice of Allowance App 108146270.
Jun. 3, 2021—(TW) Search Report App 108146270.
Jul. 28, 2021—(EP) Office Action—EP19900402.9.
Jul. 22, 2021—(KR) Office Action—10-2020-7006998.
Advertising with Transparent LCD Displays; Jul. 28, 2016, URL: http://www.displays2go.com/Article/Advertising-Transparent-LCD-Displays-78>.
htttp://emotivev.com/products; at least as early as Jun. 5, 2017.
https://www.youtube.com/watchv=2tlM9lereLc; at least as early as Jun. 5, 2017, "Digital Signage Transparent LCD Beverage Cooler Demo".
Oct. 24, 2018—(WO) International Search Report and Written Opinion—App PCT/US2018/046103.
Jul. 27, 2020—(TW) Search Report App 108146270.
Jul. 29, 2020—(TW) Office Action—App 108146270—Eng Tran.
Nov. 19, 2020—(EP) Search Report—18843780.
Extended EP Search Report for EP 12782036, dated Jun. 9, 2015, 7 Pages.
U.S. Notice of Allowance On U.S. Appl. No. 14/170,378, dated Mar. 31, 2015, 10 Pages.
File History of U.S. Appl. No. 16/547,288, filed Aug. 21, 2019.
File History of U.S. Appl. No. 15/888,210, filed Feb. 5, 2018 (Part 1 & 2).
File History of U.S. Appl. No. 14/819,257, filed Aug. 5, 2015, (U.S. Pat. No. 9,504,338).
File History of U.S. Appl. No. 14/686,958, filed Apr. 15, 2015, (U.S. Pat. No. 9,155,405).
File History of U.S. Appl. No. 14/170,378, filed Jan. 31, 2004, (U.S. Pat. No. 9,052,536).
File History of U.S. Appl. No. 13/286,053, filed Oct. 31, 2011, (U.S. Pat. No. 8,683,745).
File History of U.S. Appl. No. 61/484,616, filed May 10, 2011.
International Search Report of PCT/US19/66869 dated Mar. 16, 2020.
Written Opinion of PCT/US19/66869 dated Feb. 11, 2020.
Neff, J., "New System Puts Video Ads on Store Cooler Doors", (2015), AdAge, http://adage.com/article/cmo-strategy/system-puts-video-ads-store-cooler-doors/301395, pp. 1-3.

(56) References Cited

OTHER PUBLICATIONS

Jul. 1, 2020—U.S. Notice of Allowance—U.S. Appl. No. 16/222,643.
Jun. 3, 2021—(WO) International Search Report and Written Opinion—App PCT/US2021/013247.
May 4, 2022—(WO) International Preliminary Examination Report (Chapter II)—App PCT/US2021/013247.
May 26, 2022—(KR) Notice of Allowance App 10-2020-7006998.
Kamoda, Rena. "Monitoring Grocery Inventory in Refrigerators using Appearance and Load Balance Features." (2013). (Year: 2013).
Jul. 18, 2022—(EP) Search Report—App. No. EP19900402.9.
Jun. 17, 2022—(TW) Search Report App 110132225 w/ Eng. Trans.
Jan. 9, 2023—U.S. Notice of Allownace—U.S. Appl. No. 15/931,971.
Oct. 28, 2022—U.S. Notice of Allowance—U.S. Appl. No. 16/763,448.

\* cited by examiner

SMART MOVABLE CLOSURE SYSTEM FOR COOLING CABINET

TECHNICAL FIELD

A smart, movable closure system that allows access to the interior from the exterior of the cabinet, is disclosed. In some embodiments, the movable structure may be coupled with a cabinet interior that is adapted to be kept at a temperature cooler than the exterior cabinet ambient temperature, for example, to store perishable consumer goods in a retail setting. In particular, the smart, movable closure system may include electronic components that display graphical renderings corresponding to one or more products stored in the retail product container.

RELATED APPLICATIONS

This application claims the benefit of priority to at least International Patent Application serial no. PCT/US2019/066869, filed Dec. 17, 2019, published as TBD, and U.S. application Ser. No. 16/222,643, filed Dec. 17, 2018, published as U.S. Patent Application Publication no. 2019/0122263 on Apr. 25, 2019; both of the aforementioned are incorporated by reference in their entireties herein.

BACKGROUND

Although more and more people are purchasing items online, brick and mortar retail sales (for example, provided through cooling systems) are still substantial and are, in fact, growing in certain market segments such as grocery, drug, and convenience stores. Over 75 percent of shopping in brick and mortar stores is impulse purchasing. Research shows that impulse decisions are highly influenced by in-store messaging, and that most of in-store impulse shopping occurs at retail product containers, such as coolers and freezers. Consequently, a disruption of impulse shopping behavior at a retail product container could present an enormous value creation opportunity for both consumer packaged goods brands and retailers.

SUMMARY

A computing platform comprises one or more retail product containers and a controller that generates different advertisements (ads) on displays of the one or more retail product containers in a cooling system. Each of the retail product containers includes an internal storage volume for stocking one or more retail products, a display (screen) on its door, and a customer detector to detect the presence of one or more customers in proximity to the retail product container. The controller communicates with each of the retail product containers over a communications channel (e.g., a wireless channel), for example, to display advertisements for viewing by the one or more customers. For example, the controller may be configured to instruct a retail product container to display a full screen advertisement on its display. The displaying of the full screen advertisement may be a default procedure or may be performed when no motion (e.g., of a customer) or a human form is detected by the customer detector. When motion (e.g., of a customer) or human form is detected within a predetermined distance, the controller may subsequently instruct the retail product container to terminate the full screen advertisement and to display a planogram of products located in the internal storage volume.

With another aspect, a customer detector of a retail product container may include one or more cameras and proximity sensors. The one or more cameras and proximity sensors may be situated on a door front of the retail product container.

With another aspect, when a customer is detected as being sufficiently close to a container door, an invitation indication may be displayed on the container's display. For example, a quick response (QR) code may be generated at the center of a planogram. The detected customer can scan the QR code through a wireless device if the customer desires to opt-in, in response to the invitation. When the customer opts-in, a computing platform may interact with the customer via a mobile app. In some examples, in lieu or in addition to a QR code, an image other than a QR code (e.g., an image with a machine-detectable watermark), a Bluetooth (or other short-range wireless protocol) beacon, or other mechanism may be provided to indicate an invitation to the customer.

With another aspect, when a customer opts-in in response to a displayed invitation on a container's display, a personalized advertisement may be displayed in accordance with customer information that is obtained through a mobile app. The personalized advertisement may be indicative of customized pricing for one or more products stocked at the retail product container.

With another aspect, when a customer does not opt-in in response to an invitation, the computer platform may continue to generate a planogram with inserted advertisements (for example, banner ads, spot deals, and hot spots) based on generalized information (for example, weather conditions, weather forecasts, and current or upcoming events).

With another aspect, a computing platform may download a set of advertisements (for example, from a cloud computing service) that is relevant to a retail product container. Further, the computing platform may generate one of the downloaded advertisements on a display of the retail product container. The set of downloaded advertisements may be based on a type of product stocked at the retail product container. The type of product may be determined from a container identification or from inventory information provided by the retail product container.

With another aspect, a computing platform may determine an advertisement presented on a display of the retail product container, based on a set of rules that may encompass weather conditions in proximity to the container, the date, and/or characteristics about a customer in proximity to the container. For example, the presented advertisement may be selected because a customer is standing by a beverage container for 20 seconds, it is 98 degrees outside, and the date is just before the Fourth of July.

With another aspect, a computing platform may determine a measure of effectiveness for an advertisement presented on a display of a retail product container. For example, the computing platform may detect whether a customer is within a determined distance of the retail product container and/or whether more than a predetermined number of customers are viewing the presented advertisement.

With another aspect, computing platform may generate an advertisement targeted at a product level. For example, a customer detector may detect that a customer is viewing a particular product displayed in a planogram at a retail product container.

With another aspect, a displayed advertisement at a first retail product container may promote a product that is stocked at a second retail product container. For example, a computing platform may predict that a customer will shop at the second retail product container after shopping at the first retail product container based on customer information.

BRIEF DESCRIPTION OF THE DRAWINGS

The foregoing summary, as well as the following detailed description of exemplary embodiments, is better understood when read in conjunction with the accompanying drawings, which are included by way of example, and not by way of limitation with regard to the claimed invention.

DETAILED DESCRIPTION

Figure 1:
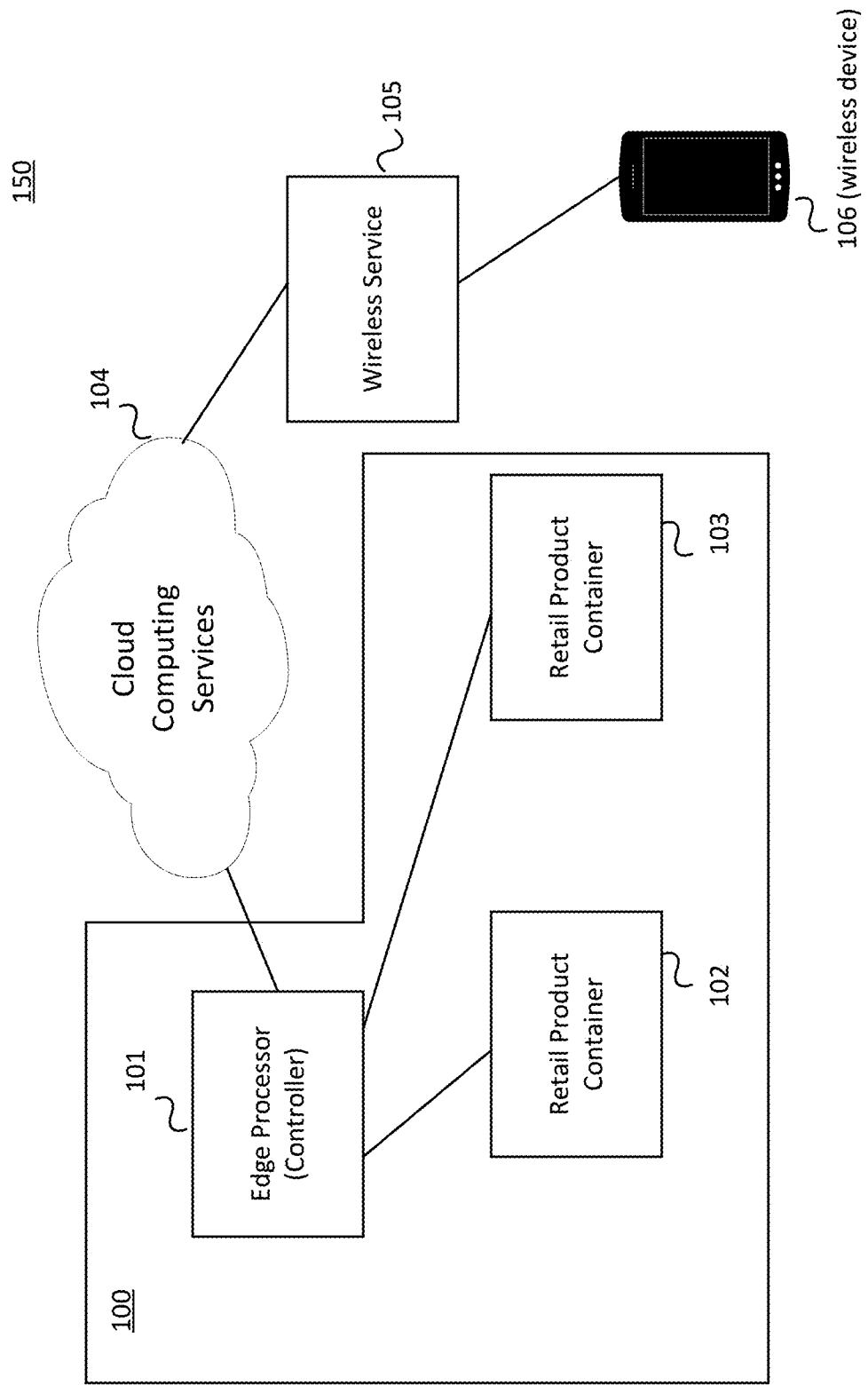
FIG. 1 shows a computing platform supporting one or more retail product containers in accordance with an embodiment.

According to an aspect of some of the embodiments, a smart, movable closure system is disclosed. The system may, in some embodiments, comprise electronic components that capture images and/or other media (e.g., audio, video, infrared data, or other media) of the interior of a cabinet or the exterior of the cabinet. Moreover, the system may also, in some embodiments, comprise electronic components that display, among other things, graphical renderings or other visual output corresponding to one or more products stored in cabinet. The cabinet may be adapted to be kept at a temperature cooler than the exterior cabinet ambient temperature, for example, to store perishable consumer goods in a retail setting. As such, the retail product container may provide a system that interfaces with users in a retail environment.

A computing platform generates displayed content at a retail product container of a cooling system based on information about a customer in proximity to the retail product container, one or more products stocked at the retail product container, and generalized information external to the retail product container. According to an aspect of some embodiments, the computing platform may generate selected advertisements (ads) at one or more retail product container. The retail product container includes an internal storage volume for stocking one or more products, a display on the container's door, and a customer detector to detect the presence of a customer in proximity to the retail product container. With an embodiment, when a customer is detected to be located within a predetermined distance from the retail product container, an invitation indicator is displayed on the container's display. When the customer opts-in, a personalized advertisement may be displayed in accordance with customer information that may be obtained through a mobile app. The personalized advertisement may also include customized pricing for one or more products stocked at the retail product container.

Coolers may be one of the most overlooked, least promoted, least technology sophisticated, and may be one of the most operationally challenged sections of a retail store. Conventional retail product containers (e.g., coolers, freezers, vending machines, etc.) may comprise a glass panel or door through which a customer can view products stored in the retail product container and which can be available for purchase. However, stored products may not be neatly presented, and stored products may be blocked by other products, such that a customer cannot easily see what products are available for purchase. Still further, store employees may often be required to maintain the appearance of the products stored therein, keep track of stock, or install and swap out promotional tags and other displays (such as displays relating to pricing and promotions) in order to keep those items current.

With these traditional approaches to retail product containers described above, coolers and refrigerators in grocery stores may be an area that is difficult for brands to conduct effective "on-the-spot" advertisements and promotions. Brands may typically rely on other advertising medias (for example, print, billboards, online and TV advertisements, and so forth) to promote products that are retailed on the shelves of coolers/freezers and/or refrigerators at retail and convenience stores.

Furthermore, with these traditional approaches described above, advertising efforts may not be as effective and impactful. Due to the limitations of traditional approaches, market penetration has been very small.

FIG. 1 shows computing platform 100 supporting one or more retail product containers in accordance with an embodiment. Computing platform 100, comprising controller 101 and retail product containers 102 and 103, may generate a selected advertisement at one of retail product containers based on stored products at the retail product container.

Retail product containers 102 and 103 may comprise a cooler, freezer, vending machine, and so forth and typically store different types of products (for example, milk, frozen meals, beer, ice cream, and so forth) in corresponding internal volumes.

In one embodiment of the system disclosed herein, edge processor (controller) 101 instructs retail product container 102 or 103 to display the selected advertisement based on customer information of a customer in proximity to the retail product container, products stocked at the retail product container, and generalized information (for example, weather conditions) that are not specific to the retail product container. Meanwhile, other embodiments of the system disclosed herein operate/function without any knowledge of the individual shopper/customer, and the system never seeks to identify individuals—i.e., it is "identity-blind" in that it never gathers or uses personally identifiable or linkable information. In some embodiments, selection of whether to execute an "identity-blind" set of features or otherwise may be determined on whether the system is located in a country or state where consumer desire privacy and/or applicable laws govern.

With some embodiments, controller 101 may communicate with retail product container via a wireless communication channel (for example, Wi-Fi, Bluetooth®, Zigbee®, and so forth) and may be near the retail product container or at any place in the world through the Internet.

Each retail product container 102 or 103 may support a wireless channel through a common communication interface for associated components (for example, sensors, cameras, and so forth) that is not explicitly shown. However, some embodiments may establish separate wireless communication channels for each of the different components supporting the Internet of Things (IoT) with controller 101.

With some embodiments, controller 101 may interact with additional computing facilities, for example, cloud services 104 or one or more computer servers (not explicitly shown) to obtain advertisement content and to interact with a customer via wireless device 106 through wireless service 105.

Figure 2:
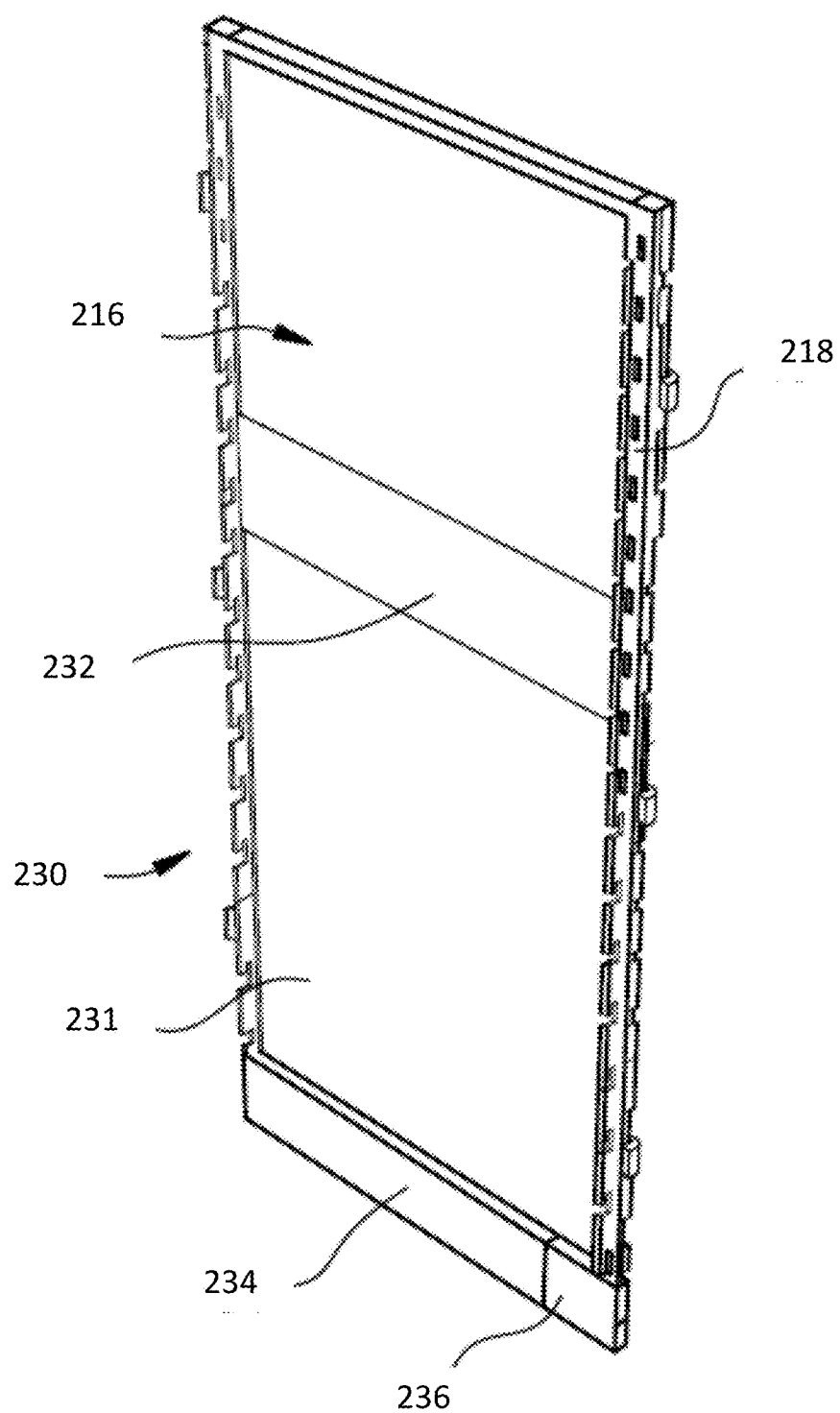
FIG. 2 shows a front of a door of a retail product container in accordance with an embodiment.

FIG. 2 shows a front view 231 of door 230 of a retail product container (for example, containers 102 and 103 as shown in FIG. 1) in accordance with an embodiment.

Each retail storage container 102 and 103 may have door 230. Display (screen) 216 is mounted on door 230 along with customer-detecting hardware 218, such as one or more proximity sensors (heat maps), cameras, facial sensors or scanners, and eye-sensors (iris-tracking sensors).

With some embodiments, display 216 comprises an LCD panel having one or more touch zones 232 which are interactive by the customer. Access panel 234 may be situated proximate to the bottom of the door 230 along with a media player 236, which provides display content to display 216.

A protective panel (not explicitly shown) may be mounted over the display 216.

Figure 3:
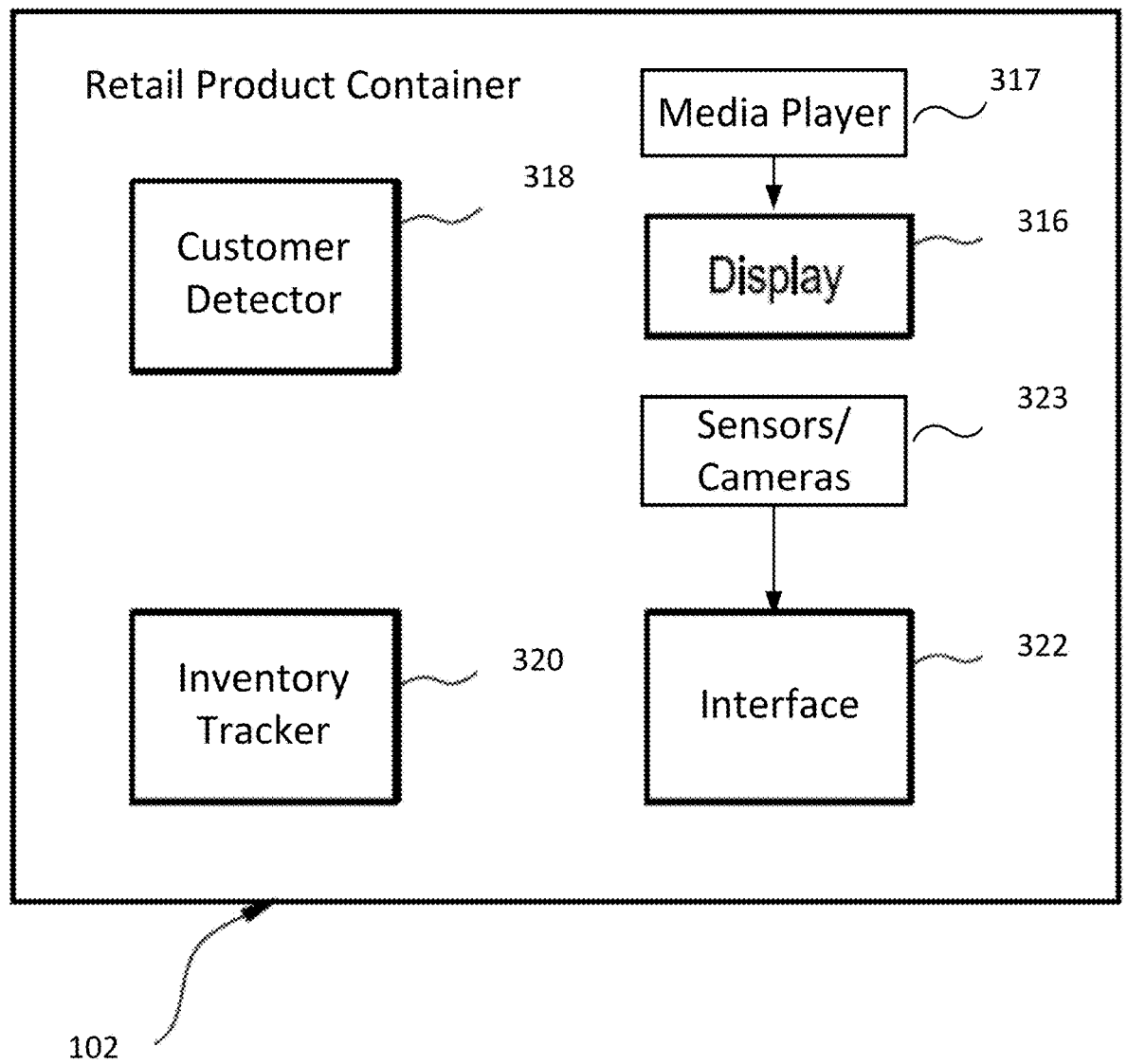
FIG. 3 shows a retail product container in accordance with an embodiment.

FIG. 3 shows retail product container 102 in accordance with an embodiment. Each retail product container 102 comprises at least one display 316, such as a display on a door of retail product container 102.

A plurality of retail product containers (similar to retail product container 102) and associated displays may be arranged side-by-side down an aisle of a retail store (for example, a grocery store). Edge processor (controller) 101 (as shown in FIG. 1) may be configured to operate the display 316 depending on what is detected, e.g., by the customer detector 318 and/or the inventory tracker 320.

With some embodiments, customer detector 318 may detect a customer when the detected object is deemed to be a human (person) (rather than, for example, a shopping cart). Customer detector 318 may further determine whether the detected person is an employee (for example, by a uniform of the employee or by a RFID tag on the employee). In such a situation, customer detector 318 may ignore the employee so that a display at a retail product container is not updated.

With some embodiments, display 316 comprises a non-transparent display which prohibits customers from viewing, through the display, products stored in the internal storage volume. Display 316 may comprise, for example, a touchscreen with which customers may interact.

Each retail product container 102 may further comprise customer detector 318 that may detect any or specific individuals (e.g., customers versus employees), motion (e.g., of a customer), a human form (e.g., a human face of a customer), heat, etc. (For example, customers may be individuals in the vicinity of a retail product container as detected by customer detector 318.) With some embodiments, the customer detector may utilize one or more of a proximity sensor (e.g., via a heat map), a camera, a facial sensor, a scanner, an eye-sensor (e.g., an iris-tracking sensor), etc. In addition to customer detector 318, the retail product container 102 may comprise other sensors/cameras 323 configured to detect activity in/around/on the retail product container 102. Although for illustrative purposes customer detector 318 has been described as an input to trigger/activate further steps (e.g., in FIG. 8, refs. 802 and 804), the customer detector 318 may be substituted with and/or supplemented with one or more other sensors/cameras 323, including but not limited to the following examples: a sensor configured to detect an open door; a sensor configured to detect movement of the door from one position to another (e.g., from closed to open, or from open to closed); a weight sensor on a shelf in the retail product container 102 to detect a change in inventory; an optical sensor (e.g., a camera) configured to detect out-of-stock products in the retail product container 102; and/or other kinds of sensor/camera operations.

With some embodiments, one or more cameras 323 may be mounted on doors of retail product container 102. The one or more cameras may have a depth of field of view of twenty feet or more and may have a range of field of view of 170 degrees with, for example, 150 degrees of facial recognition ability. Computer-readable instructions may be employed in association with the cameras to monitor shopper interactions, provide relevant advertisement content on the display 316 via media player 317, and track advertisement engagement in-store. Controller 101 (as shown in FIG. 1) may be configured to independently control each camera, as well as collectively control a plurality of displays to provide single-screen and/or multiple screen content and interactions. Controller 101 and display 316 may be configured to allow for both banner advertisements 402 and full-screen advertisements 401 to be displayed on display 316.

Each retail product container 102 may further comprise inventory tracker 320, e.g., to identify, quantify, and/or otherwise track stored retail products. In some aspects, the inventory tracker 320 may utilize additional cameras and/or sensors 323 that are disposed inside retail product container 102 and face the stored products.

As shown in FIG. 1, controller 101 may be networked with retail product container 102 through the Internet, Bluetooth, and so forth via wired Ethernet, wireless LAN, a cellular network, and the like. Controller 101 may be configured to control the display 316 of retail product container 102 as well as may be configured to receive information from retail product container 102, including information from the display 316 (for example, information regarding touchscreen interactions) as well as information from the customer detector 318 and inventory tracker 320.

Each retail product container 102 may also include interface 322 that may be configured to facilitate, among other things, the networking and transfer of information between the controller 101 and retail product container 102 and control of display 316, customer detector 318, and inventory tracker 320.

With some embodiments, controller 101 may comprise a server having one or more processors, memory storage, a user interface, and so forth and may be configured to instruct what is displayed on the display 316 and to receive information and data from the retail product container 102. Additionally, controller 101 may be configured to perform analytics based on the received information and data.

Figure 4:
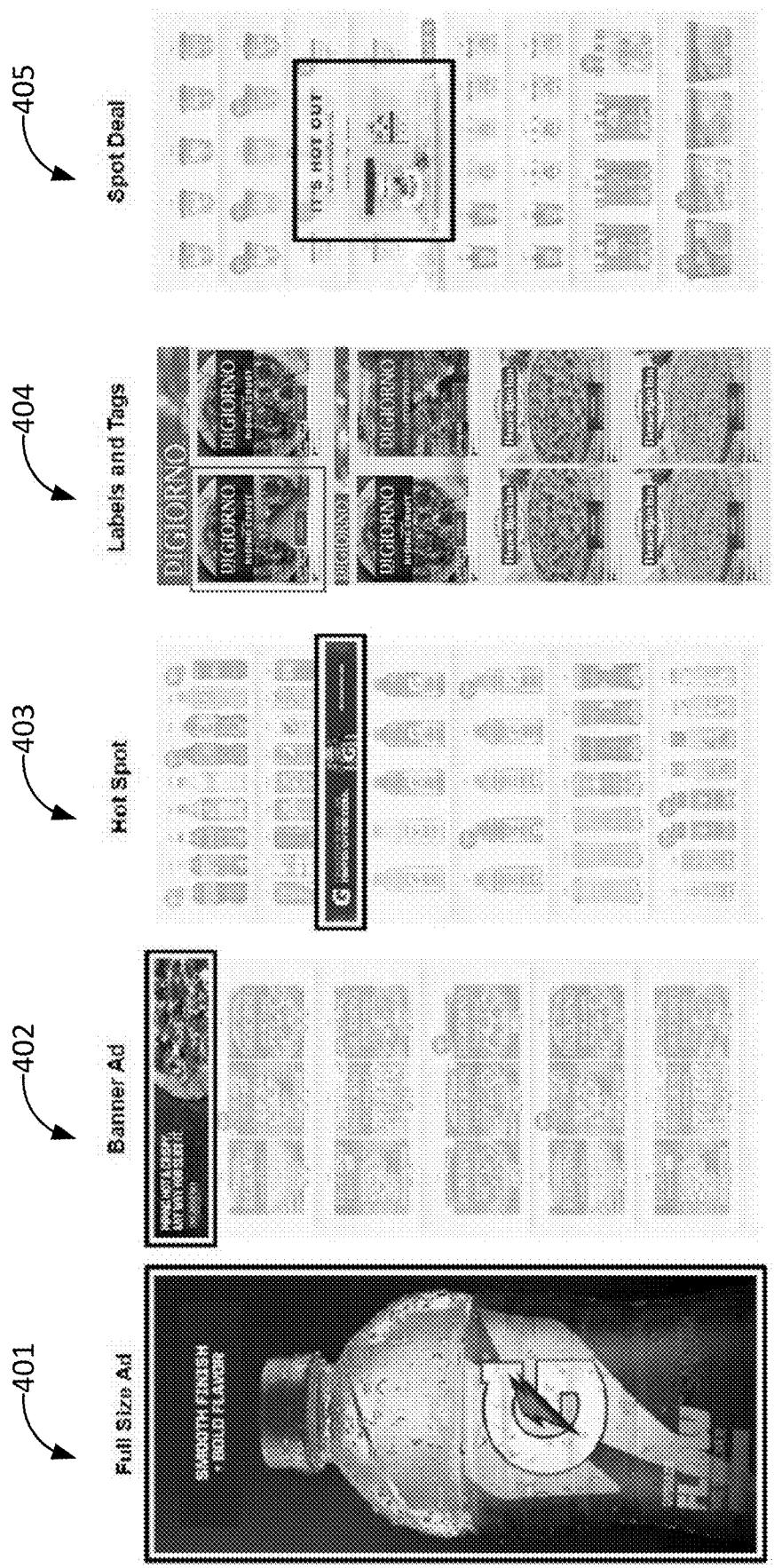
FIG. 4 shows different types of advertisements that may displayed on a screen of a retail product container in accordance with an embodiment.

Controller 101 may be configured to control the display 316 of each retail product container 102 to provide a planogram (for example, as shown in advertisements 402-406 in FIG. 4). In some aspects, the planogram may relate to retail products physically contained in the internal storage volume of retail product container 102. The retail products may not necessarily be viewable through the display 316. For example, products stored in the retail product container 102 may not be neatly arranged or may be blocked from view by other products stored therein. However, the planogram may indicate (e.g., to a customer) the retail products stored within the internal storage volume, based on inventory information provided by inventory tracker 320. Consequently, the displayed planogram may effectively optimize what is presented to the customer.

While not explicitly shown in FIG. 3, embodiments of retail product container 102 may include other components (for example, a refrigeration unit and so forth) needed for physically storing products within its internal volume.

FIG. 4 shows different types of advertisements 401, 402, 403, 404, 405 that may be displayed on screen 316 (shown in FIG. 3) of retail product container 102 in accordance with an embodiment.

Advertisement 401 shows a full screen advertisement while advertisements 402-405 (corresponding to a banner ad, hot spot, label/tag, and spot deal, respectively) show inserted offers within a planogram for retail product container 102. For example, display advertisement 404 may include labels at the bottom of the image of the product and tags at the top of the image of the product on the display screen. Labels and tags may be selected and activated from a pre-determined pool of animated icons. For example, the native advertisement for the pizza in display advertisement 404 may be substituted with an animated graphic rendering of a steaming pizza.

As will be discussed, in some examples, inserted offers may be customized based on customer information for a customer in proximity to retail product container 102.

Referring to advertisement 402, customer detector 318 may detect when a customer is looking at (viewing) region 451 of an advertisement (for example, advertisement 402). If so, an advertisement that is targeted to one or more products shown in region 451 may be displayed on screen 316.

Referring to full screen advertisement 401, while a single advertisement may occupy the entire area of screen 316, embodiments may support a plurality of advertisements (in different display regions) that may be simultaneously displayed on screen 316.

Figure 5:
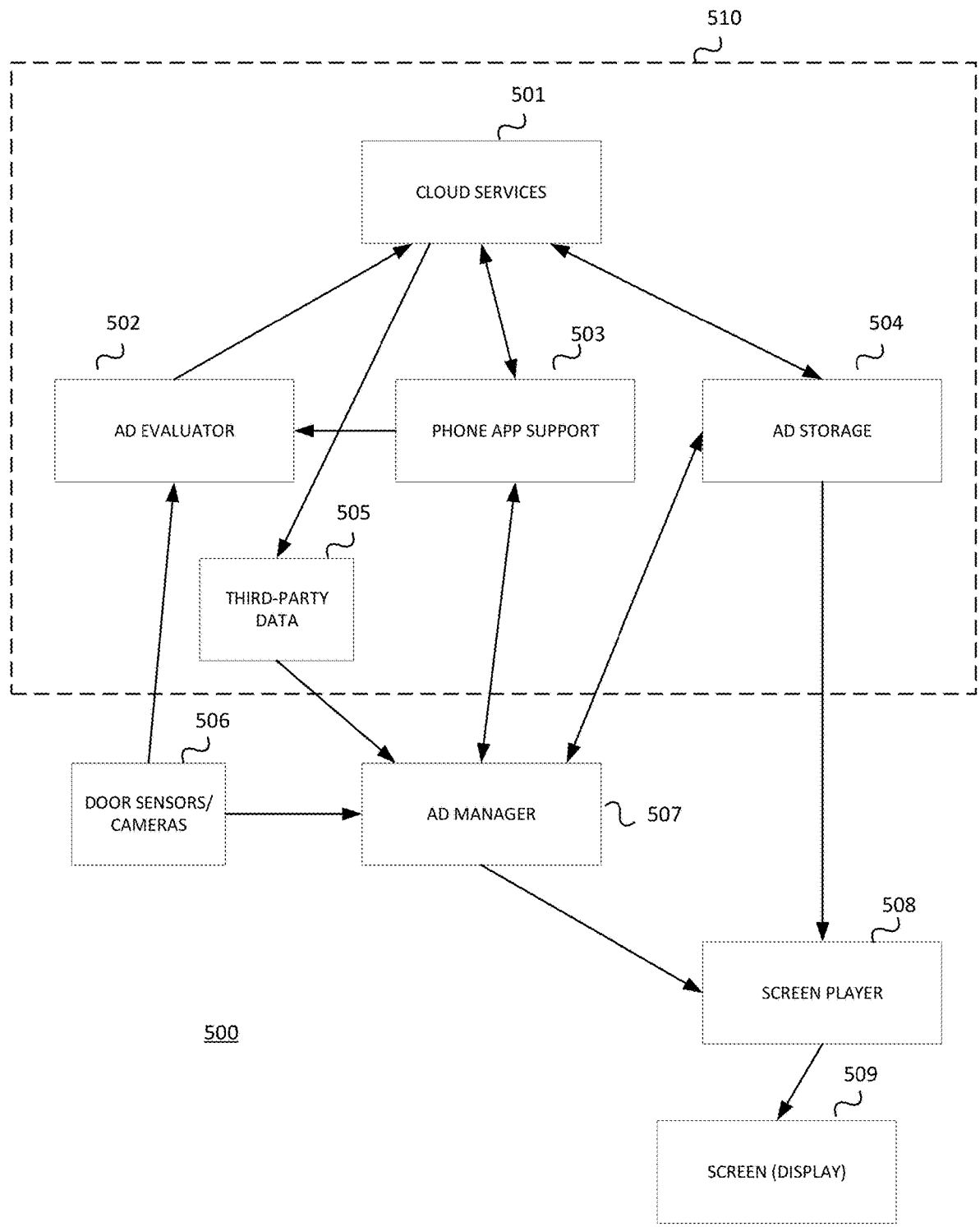
FIG. 5 shows an advertising computer system supporting one or more retail product containers in accordance with an embodiment.

FIG. 5 shows advertising computer system 500 supporting one or more retail product containers in accordance with an embodiment. Referring to FIG. 1, computer system 500 encompasses edge processor (controller) 101, retail product containers 102-103, and an interface with cloud services 104. For example, with some embodiments, components 502-505 and 507 may be implemented at edge processor 101, and components 506 and 508-509 may be implemented at retail product containers 102-103.

Referring to FIG. 5, ad manager 507 interacts with ad storage 504 to download advertisement content from cloud services 501. Ad manager 507 may request selected advertisement content (for example, based on a product type and corresponding to a plurality of advertisements) from cloud services 501 via ad storage 504 and may instruct that one of the plurality of advertisements be displayed on screen (display) 509 through screen player 508. As previously discussed, screen player 508 may comprise media player 317 and may be implemented at retail product container 102, 103 and/or controller 101.

Ad manager 507 may request a set of advertisements, varying from one advertisement to many (e.g., hundreds of) advertisements, to be downloaded for retail product container 102. The request may be based on the type of product stocked at retail product container 102. For example, this request by ad manger 507 may be based on inventory information received from inventory tracker 320 (as shown in FIG. 3) or from a mapping of a container identification to designated stored products.

Ad manager 507 may select one of the downloaded advertisements based on sensor/camera information from door sensors/cameras 506 (for example, located at door 230 as shown in FIG. 2), third party data module 505, and/or phone app support module 503.

As will be discussed in further detail, ad evaluator 502 may determine an effectiveness of a presented advertisement on screen 509 based on information from door sensor/camera 506 and phone app support module 503. For example, door sensor/camera 506 may indicate that a customer is viewing a particular region of the displayed advertisement and/or the customer may indicate the effectiveness through a mobile app. The level of effectiveness (as shown at blocks 1006-1010 in FIG. 10) may be determined in a numbers of ways. For example, the levels may be mapped to different values of time durations that the customer is looking at a product in the displayed advertisement or may be directly obtained from a customer's input via the mobile app.

While cloud services may be used to provide additional computer resources as needed by advertising computer system 500, computer resources may be provided by one or more computer servers that may be otherwise provided by cloud services 501. For example, ad manager 507, ad evaluator 502, phone app support 503, and/or third-party data 505 may all reside in the cloud 510. Moreover, the aforementioned systems may all be referred to together, or separately, as cloud services 501. For example, a vendor may provide ad content through ad storage 504 so that the ad manager 507 may download advertisement content from the cloud 510. Ad manager 507 may request selected advertisement content (for example, based on a product type and corresponding to a plurality of advertisements) from the cloud 510 an show it on screen (display) 509 through screen player 508. Although components in FIG. 5 are displayed as separate, the disclosure is not so limited; and one or more components may be conflated and/or bifurcated.

Figure 6:
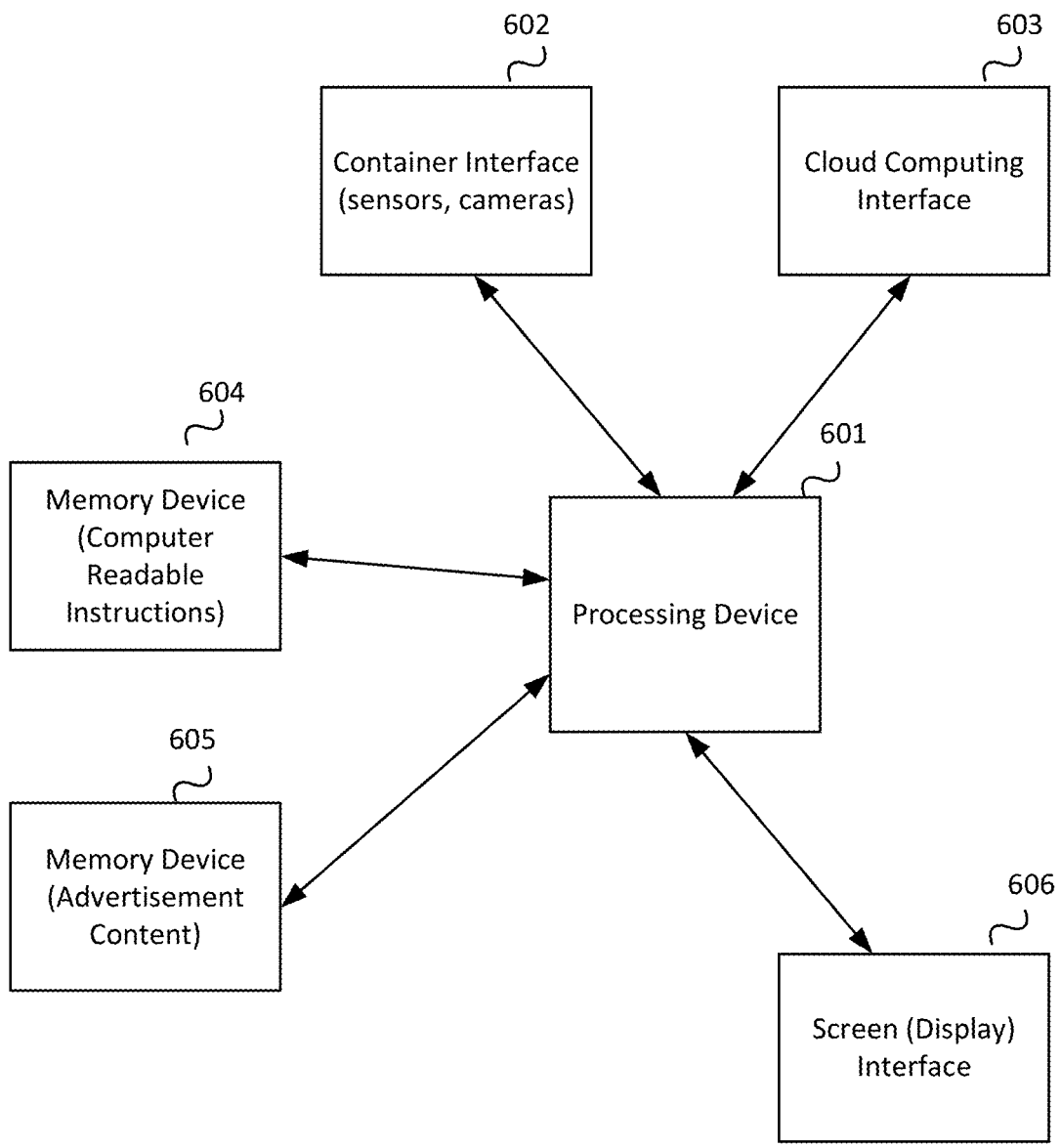
FIG. 6 shows an edge computing apparatus that supports one or more retail product containers in accordance with an embodiment.

FIG. 6 shows edge computing apparatus (controller) 600 that may support one or more retail product containers (for example, retail product containers 102 and 103) in accordance with an embodiment.

Controller 600 may include processing device 601 where processes (for example, processes 700-1200 as shown in FIGS. 7-12, respectively) discussed herein may be implemented. Processing device 601 may control the overall operation of controller 600 and its associated components. Processing device 601 may access and execute computer readable instructions from memory device 604, which may assume a variety of computer readable media. For example, computer readable media may be any available media that may be accessed by processing device 601, and may include both volatile and nonvolatile media and removable and non-removable media. By way of example, and not limitation, computer readable media may comprise a combination of computer storage media and communication media.

In addition, processing device 601 may download advertisement content from cloud services via cloud interface 603, store the downloaded content at memory device 605, access the downloaded content (for example, a selected advertisement) from memory device 605, and provide the advertisement content to display 316 via screen interface 606. As previously discussed, advertisement content may be presented to display 316 through media player 317 as shown in FIG. 3.

As previously discussed, controller 600 may obtain advertisement content (via ad storage 504 as shown in FIG. 5) and third party data (via third party data module 505) from cloud services 501 via cloud computing interface 603. In addition, controller 600 may interact with a customer via wireless communication (e.g., via phone app support module 503), and may provide advertisement evaluation (e.g., via ad evaluation 502) through cloud computing interface 603.

Computer storage media may include volatile and nonvolatile and removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media may include computer readable instructions, data structures, program modules or other data in a modulated data signal such as a carrier wave or other transport mechanism and includes any information delivery media. Modulated data signal can be a signal that has one or more of its characteristics set or changed in such a manner as to encode information in the signal. By way of example, and not limitation, communication media may include wired media, such as a wired network or direct-wired connection, and wireless media such as acoustic, RF, infrared and other wireless media.

Processing device 601 may also obtain sensor/camera data from customer detector 318 and inventory tracker 320 through interface 602. Processing device 601 may use this data to determine a location of a customer (e.g., via customer detector 318) with respect to retail product container 102 and the current inventory of retail product container 102.

Controller 600 (executing computer readable instructions from memory 604) may be configured to control the display 316 of each retail product container 102 (as shown in FIG. 3) to display current pricing information about products physically contained in the internal storage volume of retail product container 102, where the pricing may be determined by controller 600.

Controller 600 may be configured to detect customers from information provided customer detector 318 (as shown in FIG. 3) through interface 602 and may be configured to display promotions on display 316 via screen interface 606 based on information from customer detector 318.

Controller 600 may effectively obtain inventory information of each retail product container 102 (via inventory tracker 320 along with image recognition software). Controller 600 may be configured to transmit data to a distributor via cloud interface 603 and/or store regarding overall stock relating to the inventory of the plurality of retail product containers. For example, system 150 (as shown in FIG. 1) may be configured to issue restock notifications, provide merchandising updates, pricing management, real time sales data, and behavioral consumer analytics.

Figure 8:
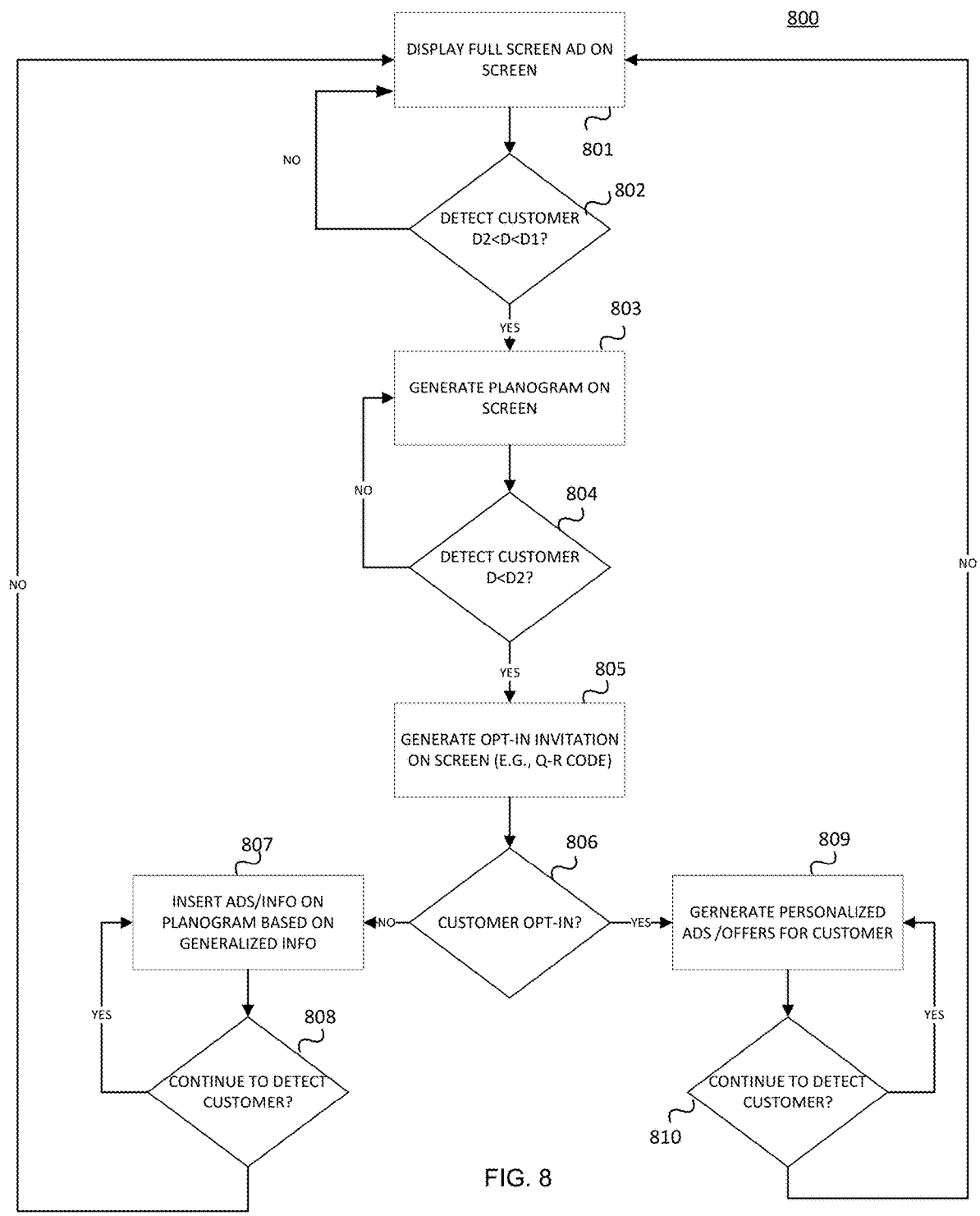
FIG. 8 shows a flowchart for generating advertisements on a screen of a retail product container in accordance with an embodiment.

Controller 600 may be configured to instruct display 316 to display full screen advertisements when a customer is not sufficiently close to a retail product container (for example, at block 801 as shown in FIG. 8) by customer detector 318. For example, as a customer is approaching an aisle but at a detected distance greater than a predetermined value, the customer may see full screen advertisements on display 316. As another example, when no customer is detected within the capability of customer detector 318, controller 600 may instruct display 316 to display a full screen advertisement in accordance with a default procedure. In one embodiment in accordance with the system disclosed herein, customer detector 318 may use motion to detect whether a customer is present. In other embodiments in accordance with the system disclosed herein, the customer detector 318 may operate by detecting a human form. For example, in one embodiment, the customer detector 318 may trigger when a human adult face is detected, but not simply when motion is detected. Such embodiments may reduce the quantity of false positives e.g., a pet, a baby, or non-human movement such as wind might not trigger the customer detector 318. In some embodiments, the human form may be anonymized in that only a human form may be detected without any uniquely identifying characteristics of the person. In other embodiments, other levels of details may be detected, captured, and/or filtered by the customer detector 318 in conjunction with one or more other components of the system disclosed herein, including but not limited to sensors/cameras 323.

As an example, if motion or a human form were detected within twenty feet of retail product container 102 (where customer detector 318 mounted on the door of that retail product container 102), controller 600 may be configured to terminate displaying a full screen advertisement and transition to displaying a planogram of products which are located inside retail product container 102. Banner advertisements and pricing tags may also be loaded from memory 605 and displayed at the same time as displaying the planogram. Controller 600 may also be configured to manage merchandising advertising objects and layers.

Controller 600 may be configured such that as a shopper (e.g., a customer) approaches closer to retail product container 102, advertisement content on display 316 can subsequently change. For example, display 316 may change to include labels (for example, organic, non-gmo, and so forth as shown in FIG. 4) and tags (for example, sale with local card, locally made, trending, and so forth). Promotional labels and tags may be activated via the controller 600 and may be selected from a pre-determined set of static animated icons or may be customized by the retailer and/or brands based on business and marketing needs. In one embodiment in accordance with aspects of the system disclosed herein, controller 600 may be configured to incorporate customer rating scores (for example, 1-5 stars, trending, or favorites) using one or more consumer review sources (for example, using third party data 505 as shown in FIG. 5). Meanwhile, other embodiments of the system disclosed herein operate/function without any knowledge of the individual shopper/customer, and the system never seeks to identify individuals—i.e., it is "identity-blind" in that it never gathers or uses personally identifiable or linkable information. In some embodiments, selection of whether to execute an "identity-blind" set of features or otherwise may be determined on whether the system is located in a country or state where consumer desire privacy and/or applicable laws govern.

Controller 600 may be configured so that as a shopper stands or lingers in front of a given retail product container 102, the contents (e.g., graphical renderings) outputted at display 316 may change again. In some embodiments, controller 600 is able to use information from customer detector 318 to effectively learn more about that particular customer, such as gender, age, mood, and so forth. (Alternatively or in combination, as will be discussed, controller 600 may obtain customer information through a mobile app when a customer opts-in in response to a displayed invitation.) In such embodiments, controller 600 may be configured to process detected customer information to determine a specific or customized advertisement to present to that particular customer on display 316. By tracking shopper data in parallel with which advertising content is being presented on the displays of all retail product containers within the viewing range of the shopper, the retailer has new influence opportunities at the moment of purchasing decision, thus optimizing marketing spend and generating new revenue streams with respect to traditional approaches. Meanwhile, other embodiments of the system disclosed herein are designed with privacy and security features integrated into the technology platform and operating model. And, such embodiments operate/function without any knowledge of the individual shopper/customer, and the system never seeks to identify individuals—i.e., it never gathers or uses personally identifiable or linkable information. In such embodiments, a retail consumer-safe platform is provided that is "identity-blind." In some embodiments, selection of whether to execute an "identity-blind" set of features or otherwise may be determined on whether the system is located in a country or state where consumer desire privacy and/or applicable laws govern. Controller 600 may be configured so that, while a shopper is standing in front of display 316 (as may be detected by a camera mounted on a door of that particular retail product container 102), relevant conditional advertisements are displayed on display 316 based on real-time data relating to news events, weather, sporting events, and so forth.

As discussed above, controller 600 may be configured to keep track of the inventory of retail product container 102 via inventory tracker 320, which may comprise one or more cameras and/or sensors on the inside of retail product container 102. When controller 600 has determined that a given product is out of stock, controller 600 may modify the displayed content on display 316. For example, out-of-stock artwork may be displayed and/or advertisements may be swapped.

As will be discussed, processes 700-1200 (as shown in FIGS. 7-12, respectively) are some of the processes that may be executed in accordance with aspects of one or more embodiments. Referring to FIG. 6, processing device 601 may execute computer readable instructions from memory device 604 to perform processes 700-1200.

Figure 7:
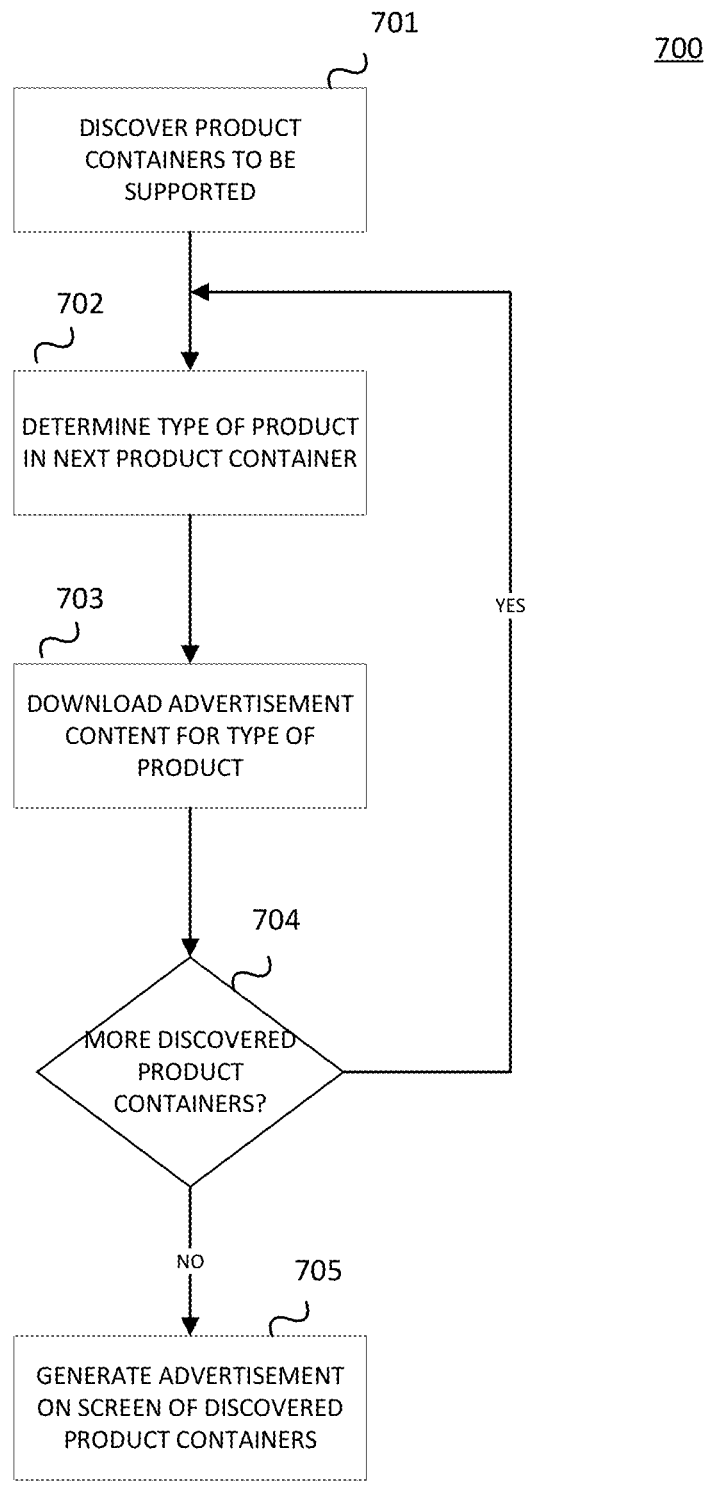
FIG. 7 shows a flowchart for configuring an advertising system in accordance with an embodiment.

FIG. 7 shows flowchart 700 for configuring computing platform 100 (as shown in FIG. 1) supporting advertising computer system 500 in accordance with an embodiment.

At block 701, controller 600 discovers the retail product containers (for example, containers 102 and 103) that are to be supported by controller 600. (A retail product container is supported by a controller when the controller controls the advertisements displayed at the retail product container.) Embodiments may utilize a known list of retail product containers and associated devices including sensors and cameras or may use a discovery procedure (for example, for discovering IoT devices including sensors and cameras and associating them to corresponding retail product containers).

When supported retail product containers are discovered, controller 600 determines the type of product/manufacturer stored in a given retail product container (for example, retail product container 103) at block 702. For example, the retail product container may report scanned universal product codes of its stocked products. Alternatively or in combination, controller 600 may access a mapping between each supported retail product container and corresponding stocked product types. At block 703, controller 600 may download relevant advertisements (which may be referred to as a set of advertisements) pertinent to the stocked products of the given retail product container.

If there are additional supported retail product containers, as determined at block 704, blocks 702-703 may be repeated for the next supported retail product container.

After content for pertinent advertisements have been downloaded, controller 600 may instruct each retail product container to display one of the downloaded advertisements based on various criteria (for example, as determined by processes 800, 900, 1100, and 1200).

FIG. 8 shows flowchart 800 for generating advertisements on a screen of a retail product container in accordance with an embodiment. Initially, a full screen advertisement is displayed on a display of a retail product container at block 801. For example, as previously discussed, controller 600 may instruct retail product container 102 to display an appropriate advertisement based on products stocked at retail product container 102.

When customer detector 318 (as shown in FIG. 3) determines that a customer is within a predetermined range at block 802, controller 600 may instruct retail product container 102 to display a planogram at block 803 that reflects products stocked at retail product container 102.

When customer detector 318 determines that the customer approaches retail product container 102 even closer (within a predetermined distance—e.g., within twelve to fifteen feet) at block 804, controller 600 may generate an opt-in invitation within the displayed planogram at block 805. For example, the invitation may comprise a Quick Response (QR) code in the center of the display. If the customer wishes to opt-in, the customer can scan the QR code through the customer's smart phone to open a link or to download a mobile app associate with the QR code. In other examples, in lieu or in addition to a QR code, an image other than a QR code (e.g, an image with a machine-detectable watermark), a Bluetooth (or other short-range wireless protocol) beacon, or other mechanism may be provided to indicate an invitation to the customer. In some examples, multiple invitations may be simultaneously transmitted to that user's device to provide the customer an option to select whichever mechanism is most preferred. In other examples, the indicated invitations may be transmitted serially such that a first method (e.g., a wireless beacon) may be used when the customer is at a particular distance range from the retail product container 102 and a second method (e.g., a QR code) may be used when the customer is in a closer proximity to the container 102. Although an example of a predetermined distance of twelve to fifteen feet was described in one of the preceding examples, the disclosure is not so limited—e.g., depending on the mechanism used to indicate an invitation to the customer, the predetermined distance may be in a range greater than fifteen feet or in a range less than twelve feet.

When the customer opts-in, as determined at block 806, controller 600 may generate personalized advertisements on display of retail product container 102 based on customer information obtained through the mobile app. (For example, a customer opts-in when the customer accepts an invitation by scanning the presented QR code and accepting the usage agreement for the mobile app.) Pursuant to a retail consumer-safe platform, until the customer opts-in, the system may remain "identity-blind" in that it never gathers or uses personally identifiable or linkable information. The retail consumer-safe platform may be designed with privacy and security features integrated into the technology platform and operating model. Such embodiments operate/function without any knowledge of the individual shopper/customer, and the system never seeks to identify individuals. In some embodiments, selection of whether to execute an "identity-blind" set of features or otherwise may be determined on whether the system is located in a country or state where consumer desire privacy and/or applicable laws govern.

At block 809, controller 600 may generate special offers via the customer's smart phone for one or more products stocked at retail product container 102. Process 800 continues in this mode at block 810 while customer detector 318 continues to detect the presence of the customer. Otherwise, process 800 reverts back to block 801, where a full screen advertisement is displayed.

When the customer does not opt-in, as determined at block 806, advertisements may be inserted within the displayed planogram at block 807 based on generalized information (not specific to the customer). Examples are shown as advertisements 402-405 in FIG. 4. Process 800 continues in the mode at block 808 while the customer is detected. Otherwise, process 800 reverts to block 801.

When process 800 reverts to block 801 either from blocks 808 or 810, process 800 repeats executing blocks 803-810 when a subsequent customer is detected by customer detector 318 at block 802.

Figure 9:
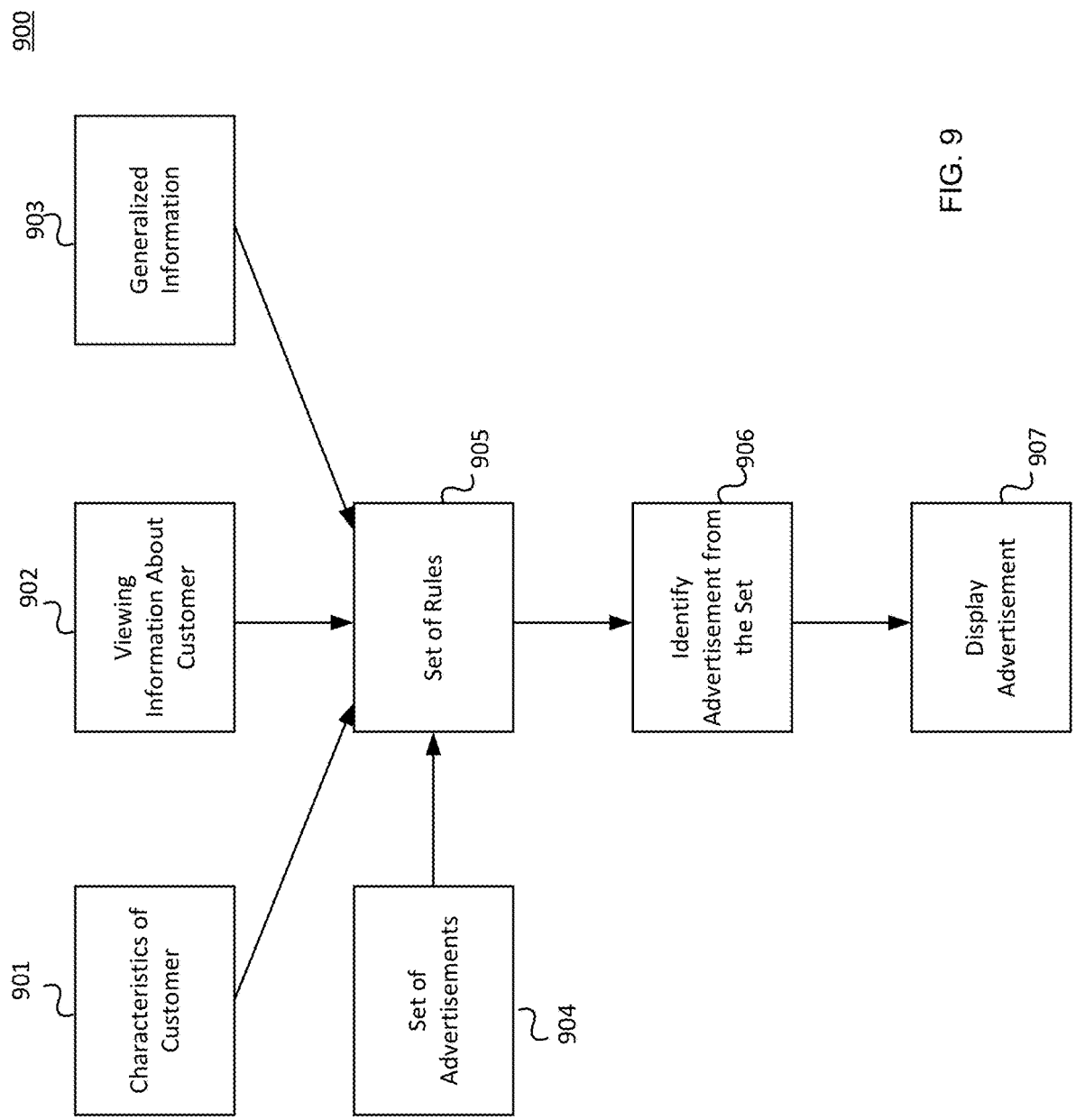
FIG. 9 shows a flowchart for displaying a selected advertisement from a set of rules in accordance with an embodiment.

FIG. 9 shows flowchart 900 for displaying a selected advertisement from a set of rules in accordance with an embodiment. Computing platform 100 determines an advertisement presented on a container's display based on a set of rules that may encompass weather conditions, the date, and/or characteristics about a customer in proximity to the container. For example, the presented advertisement may be selected because a customer is standing by a beverage container for 20 seconds, it is 98 degrees outside, and the date July 3—just before the Fourth of July.

Referring to FIG. 9, set of rules 905 selects an appropriate advertisement to be displayed from set of advertisements 904 based on different factors. In one embodiment in accordance with various aspects of the disclosure, the factors may include customer characteristics 901, customer viewing information 902, and/or generalized information 903. For example, a customer may express that he/she dislikes broccoli and likes ice cream through a mobile app (e.g., after the customer opts-in). In addition, customer detector 318 may indicate that the customer is viewing a particular region of a displayed planogram where an ice cream product appears. In such a scenario, computer platform 100 may initiate an advertisement directed to the ice cream product. However, other embodiments of the system disclosed herein operate/function without any knowledge of the individual shopper/customer, such that set of rules 90 are "identity-blind." And, those embodiments of the system never seek to identify individuals—i.e., it never gathers or uses personally identifiable or linkable information. In some embodiments, selection of whether to execute an "identity-blind" set of features or otherwise may be determined on whether the system is located in a country or state where consumer desire privacy and/or applicable laws govern.

When computing platform 100 has identified the appropriate advertisement at block 906, the identified advertisement may be displayed at the corresponding retail product container at block 907.

Figure 10:
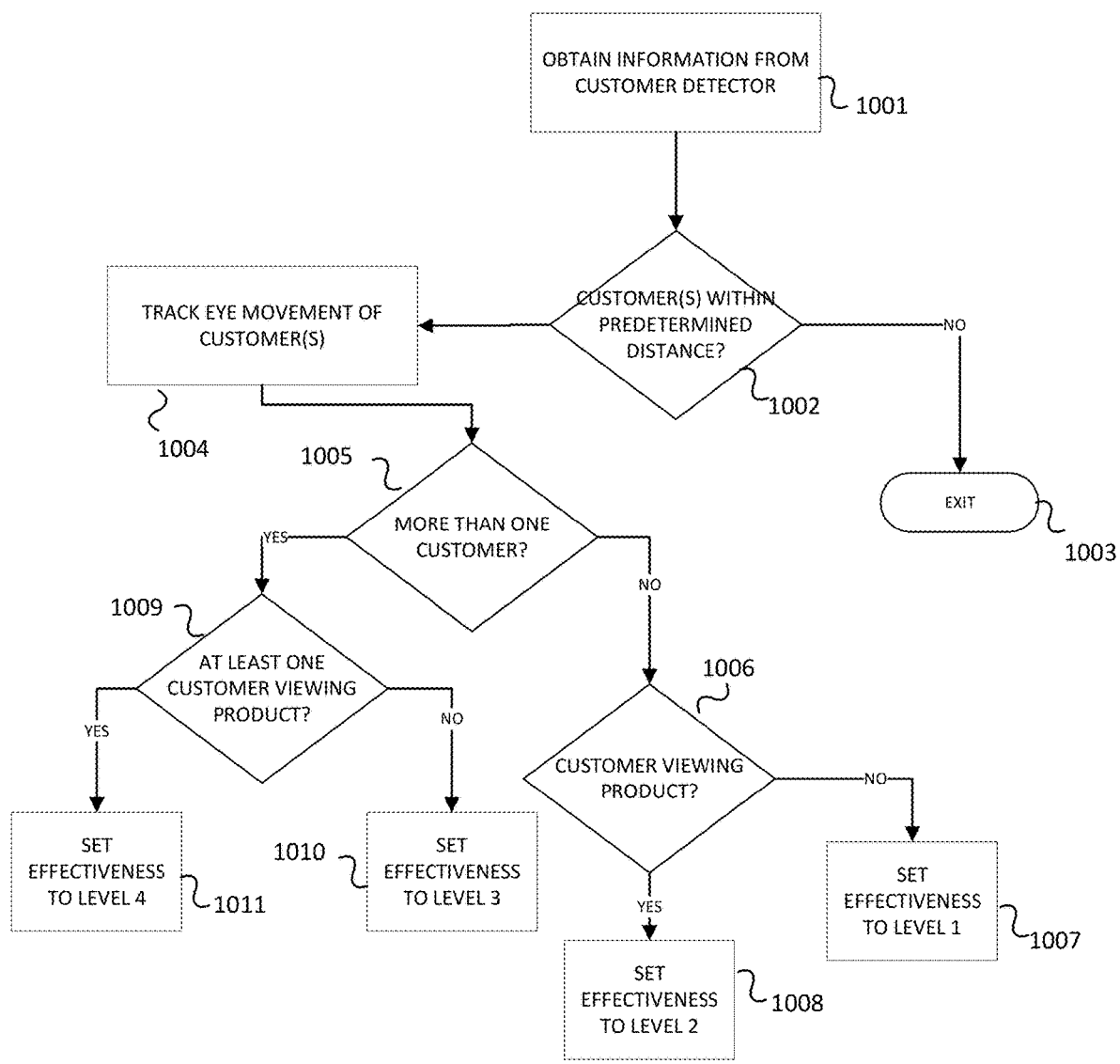
FIG. 10 shows a flowchart for determining a level of effectiveness of a displayed advertisement in accordance with an embodiment.

FIG. 10 shows flowchart 1000 for determining a level of effectiveness of a displayed advertisement in accordance with an embodiment. Computing platform 100 assesses an effectiveness of a presented advertisement on a display of a retail product container. For example, computing platform 100 may detect whether a customer is within a determined distance of the retail product container and/or whether one or more customers are viewing the presented advertisement.

Referring to FIG. 10, at block 1001 computing platform 100 may obtain customer information (for example, a distance of a detected customer from the container, an area of the display region that the customer is viewing, and/or a location from where the customer is viewing).

At block 1002, computer platform 100 determines whether a customer is within a predetermined distance (in other words, deemed to be close enough to a retail product container). If so, at block 1004 customer detector 320 (for example, via iris-scanning sensors) may track eye movement of the customer and provide eye movement information to controller 101 to determine the level of effectiveness (for example, a success measure) based on the eye movement information.

At blocks 1005, 1006, and 1009 computing platform 100 may assess the customer information to determine a level of effectiveness at blocks 1007, 1008, 1010, and 1011. For example, the customer may be staring at display region 451 of advertisement 402 (as shown in FIG. 4) versus scanning a plurality of regions. The level of effectiveness may be measured in a number of ways. For example, it may be measured by the amount of time that the customer is viewing a displayed product or by direct customer input through a mobile app (if the customer has opted-in).

However, when computing platform 100 is unable to determine a level of effectiveness, process 1000 is terminated at block 1003.

Figure 11:
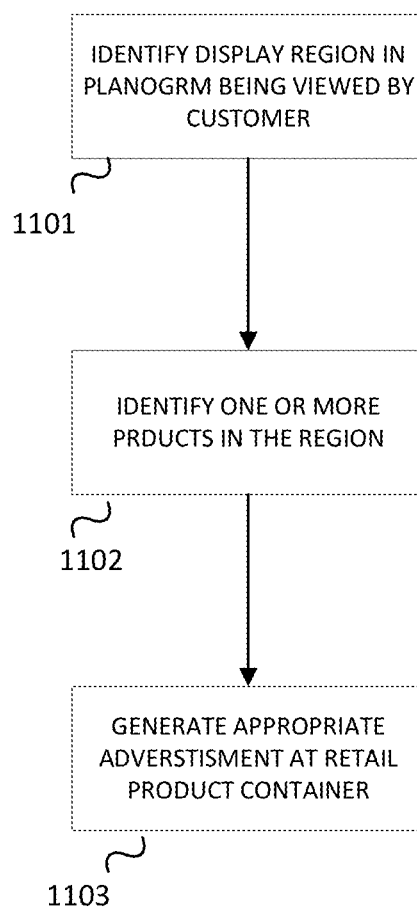
FIG. 11 shows a flowchart for generating an advertisement targeted at a product level in accordance with an embodiment.

FIG. 11 shows flowchart 1100 for generating an advertisement targeted at a product level in accordance with an embodiment. Computing platform 100 may generate an advertisement targeted a product level on a display of a retail product container. For example, a customer detector may detect that a customer is viewing a particular product displayed in a planogram at a retail product container.

Referring to FIG. 11, customer detector 318 may determine a display region that a detected customer is viewing at block 1101. For example, the customer may be viewing a lower region 451 of advertisement 402.

At block 1102, computing platform 100 may identify one or more products stocked at the detected display region. Computing platform 100 may identify the one or more products in a number of ways. For example, computing platform 100 may access a mapping of products to different regions of a displayed planogram. Alternatively or in combination, computing platform 100 may obtain inventory information about stock products at a retail product container from inventory tracker 320.

At block 1103, computing platform 100 may display an appropriate advertisement about the identified product on container's display.

Figure 12:
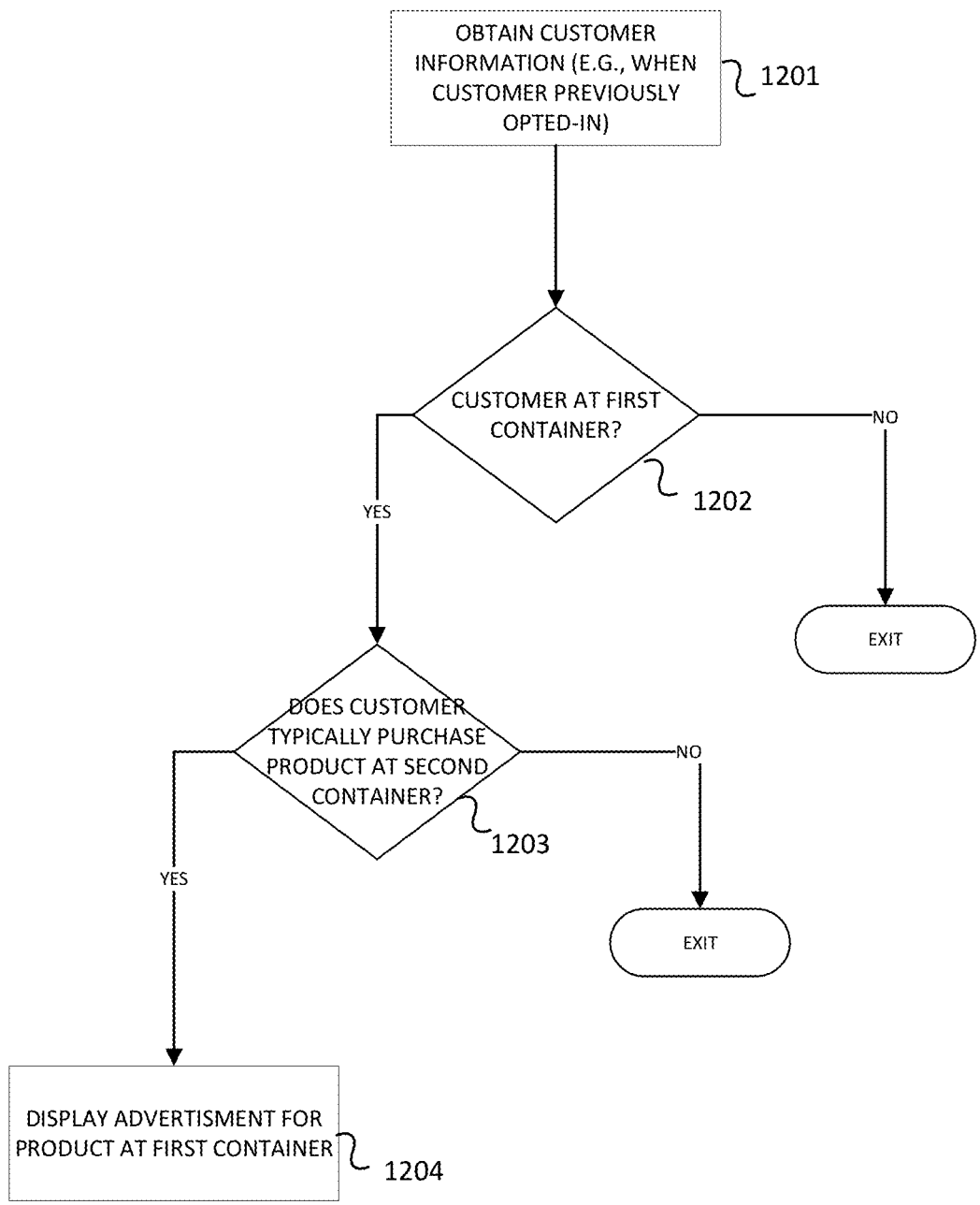
FIG. 12 shows a flowchart for displaying an advertisement at a first retail product container for a product stocked at a second retail product container in accordance with an embodiment.

FIG. 12 shows flowchart 1200 for displaying an advertisement at a first retail product container for a product stocked at a second retail product container in accordance with an embodiment. A displayed advertisement at a first retail product container (for example, retail product container 102) may promote a product that is stocked at a second retail product container (for example retail product container 103). In one embodiment of the system disclosed herein, computing platform 100 may predict that a customer will shop at the second retail product container after shopping at the first retail product container based on customer information. Meanwhile, other embodiments of the system disclosed herein operate/function without any knowledge of the individual shopper/customer, and the system never seeks to identify individuals—i.e., it is "identity-blind" in that it never gathers or uses personally identifiable or linkable information. In some embodiments, selection of whether to execute an "identity-blind" set of features or otherwise may be determined on whether the system is located in a country or state where consumer desire privacy and/or applicable laws govern.

Referring to FIG. 12, at block 1201 computing platform 100 may obtain, in one embodiment of the system disclosed herein, customer information about a customer in proximity to a first retail product container—e.g., computing platform 100 may obtain customer information about the customer likes and dislikes through a mobile app when the customer opts-in. Continuing a previous example, the customer may hate broccoli but love ice cream. Meanwhile, other embodiments of the system disclosed herein are designed with privacy and security features integrated into the technology platform and operating model. Such embodiments operate/function without any knowledge of the individual shopper/customer, and the system never seeks to identify individuals or their likes/dislikes—i.e., it never gathers or uses personally identifiable or linkable information. In such embodiments, a retail consumer-safe platform is provided that is "identity-blind." In some embodiments, selection of whether to execute an "identity-blind" set of features or otherwise may be determined on whether the system is located in a country or state where consumer desire privacy and/or applicable laws govern.

At block 1202, computing platform 100 may determine (e.g., via detection by the customer detector) whether the customer is at the first product container. If the customer is at the first product container, computing platform 100 may determine, at block 1203, whether the customer typically goes to a second retail product container, for example, where ice cream is stocked. Continuing the example, at block 1204 computing platform 100 may generate an advertisement at the first retail product container for the identified product (for example, ice cream) stocked at the second retail product container.

In some embodiments, a non-transitory computer readable medium storing instructions thereon is disclosed. When executed by a computing device, the instructions stored in the non-transitory computer readable medium may causes a computing device to: (1) determine a first product type stored in the first retail product container, and a second product type stored in the second retail product container, wherein the first product type is different from the second product type; (2) download a first set of files associated with the first product type, and a second set of files associated with the second product type, wherein the first set of files includes a first plurality of files, wherein the second set of files includes a second plurality of files, and wherein each file of the first set of files or of the second set of files corresponds to an associated advertisement; (3) initiate, from the first set of files, a first advertisement on a first display at the first retail product container; and (4) initiate, from the second set of files, a second advertisement on a second display at the second retail product container, wherein the second advertisement is different from the first advertisement. Moreover, in some embodiments in accordance with the disclosure, the aforementioned non-transitory computer readable medium may store instructions thereon that, when executed by the computing device, cause the computing device to executed steps (1)-(4) above, in addition to performing steps to: (5) detect motion of a customer within a predetermined distance of the first retail product container; and (6) in response to the detecting, generate an invitation indication to opt-in on the first display of the first retail product container. In addition, in some embodiments in accordance with the disclosure, the aforementioned non-transitory computer readable medium may store instructions thereon that, when executed by the computing device, cause the computing device to executed steps (1)-(4) above, in addition to performing steps to: (5) receive a notification when the customer opts-in; (6) in response to the receiving, interact with the customer through an application executing on a communication device of the customer to obtain customer information; (7) when the customer opts-in, receive customer information through the application; and (8) customize a customized advertisement on the first display of the first retail product container based on the customer information.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. A computer platform of a cooling system comprising:
 a first retail product container including:
  an internal storage volume;
  a movable door blocking a view of the internal storage volume;
  a first display affixed to the movable door, wherein the first display is configured to display at least a planogram of the internal storage volume; and
  a customer detector, wherein the customer detector is configured to detect a customer and receive sensor information associated the customer; and
 a controller comprising:
  one or more processors; and
  a memory storing controller instructions that, when executed by the one or more processors, cause the controller to:
  establish communications with the first retail product container over a communications channel;
  instruct the first retail product container to display a full screen advertisement;
  receive, from the first retail product container, an indication, via the customer detector, of a detection of a customer within a first predetermined distance from the first retail product container;
  instruct the first retail product container to terminate the full screen advertisement and to display a planogram of products located in the internal storage volume after receiving the indication;
  receive, from the first retail product container and via the customer detector, first sensor information indicating that the customer is within the first predetermined distance from the first retail product container, wherein the first sensor information comprises eye movement information of the customer;
determine, from the received first sensor information, customer information about the customer;
generate, based on the customer information, a selected advertisement that is appropriate for the customer;
instruct, based on the customer information, the first retail product container to display the selected advertisement on the first display; and
determine, based on the eye movement information, a success measure of the selected advertisement.

2. The computer platform of claim 1, wherein the first display comprises a non-transparent display.

3. The computer platform of claim 1,
wherein the first retail product container is configured to:
determine, via the customer detector, a number of customers viewing the selected advertisement; and
send, to the controller, information on the number of customers viewing the selected advertisement; and
wherein the controller instructions, when executed by the one or more processors, cause the controller to:
receive, from the first retail product container, the information on the number of customers viewing the selected advertisement; and
determines a level of effectiveness of the selected advertisement based on the number of customers.

4. The computer platform of claim 1,
wherein the first retail product container is configured to:
receive, via the customer detector, second sensor information about a region of the planogram being viewed by the customer in proximity to the first retail product container; and
send, to the controller, the first sensor information about the customer; and
wherein the controller instructions, when executed by the one or more processors, cause the controller to:
receive, from the first retail product container, the second sensor information about the region of the planogram; and
identify, based on the region of the planogram, a product in the planogram being viewed by the customer;
wherein the generating the selected advertisement that is appropriate for the customer is further based on the identified product in the planogram being viewed by the customer; and
wherein the instructing the first retail product container to display the selected advertisement on the first display is further based on the identified product.

5. The computer platform of claim 1,
wherein the first retail product container is configured to:
receive, via the customer detector, real-time data indicating that the customer is in front of the first display; and
provide, to the controller, the real-time data;
and wherein the controller instructions, when executed by the one or more processors, cause the controller to:
receive, from the first retail product container, the real-time data;
determine, based on the real-time data, a conditional advertisement for the customer; and
instruct the first retail product container to display the conditional advertisement on the first display based on the real-time data.

6. The computer platform of claim 5, wherein determining the conditional advertisement is further based on a set of rules that is accessed by the controller, and wherein the controller instructions, when executed by the one or more processors, cause the controller to:
determine, based on the real-time data, a time duration that the customer is within a second predetermined distance from the first retail product container and weather conditions in proximity to the first retail product container.

7. The computer platform of claim 1, further comprising a second retail product container,
wherein the controller instructions, when executed by the one or more processors, cause the controller to:
determine a first product type stored in the first retail product container, and a second product type stored in the second retail product container, wherein the first product type is different from the second product type;
download a first set of files associated with the first product type, and a second set of files associated with the second product type, wherein the first set of files includes a first plurality of files, wherein the second set of files includes a second plurality of files, and wherein each file of the first set of files or of the second set of files corresponds to an associated advertisement;
initiate, from the first set of files, a first advertisement on the first display at the first retail product container; and
initiate, from the second set of files, a second advertisement on a second display at the second retail product container, wherein the second advertisement is different from the first advertisement.

8. The computer platform of claim 7, wherein the controller instructions, when executed by the one or more processors, cause the controller to:
determine the first product type based on a first identification information of the first retail product container; and
determine the second product type based on a second identification information of the second retail product container.

9. The computer platform of claim 7, wherein the determining the first product type is further based on first inventory information obtained from the first retail product container, and wherein the determining the second product type is further based on second inventory information obtained from the second retail product container.

10. The computer platform of claim 1, further comprising a second retail product container,
wherein the second retail product container is further configured to:
receive, via a customer detector of the second retail product container, an indication that the customer is within a third predetermined distance from the second retail product container; and
send, to the controller, the indication that the customer is within the third predetermined distance from the second retail product container;
and wherein the controller instructions, when executed by the one or more processors, cause the controller to:
receive, from the second retail product container, the indication that the customer is within the third predetermined distance from the second retail product container;
generate an invitation indication to opt-in on the first display of the first retail product container;

instruct, the first retail product container, to display the invitation indication to opt-in on the first display of the first retail product container; and
receive, from the first retail product container, a notification that the customer has elected to opt-in by the customer scanning the invitation indication through a communication device;
and wherein the first retail product container is further configured to:
  display the invitation indication to opt-in on the first display of the first retail product container;
  receive an indication that the customer has elected to opt-in by the customer scanning the invitation indication through the communication device;
  send, to the controller, a notification that the customer has elected to opt-in by the customer scanning the invitation indication through the communication device; and
  interact with the customer through an application executing on the communication device.

11. The computer platform of claim 10, wherein the controller instructions, when executed by the one or more processors, cause the controller to:
  when the customer opts-in, as indicated by the notification, customize a displayed advertisement on the first display of the first retail product container for the customer based on customer information obtained through the application;
wherein the customized displayed advertisement includes customized pricing for the customer.

12. The computer platform of claim 10, wherein the controller instructions, when executed by the one or more processors, cause the controller to:
  customize a displayed advertisement for a product stocked at a third retail product container; and
  when the customer does not opt-in in response to the invitation indication, continue to generate a planogram based on generalized information.

13. The computer platform of claim 1, wherein the first retail product container further includes a sensor configured to detect movement of the movable door from a first position to a second position, and wherein the controller instructions, when executed by the one or more processors, cause the controller to:
  instruct the first retail product container to terminate the display of the planogram on the first display.

14. A method for generating advertisement content on a display screen affixed to a movable door attached to a retail product container, the method comprising:
  displaying a first advertisement on the display screen of a first retail product container;
  detecting a human form of a customer within a predetermined distance from the first retail product container;
  in response to the detecting, instructing the first retail product container to terminate the first advertisement and to display on the display screen a planogram of products located in an internal storage volume of the first retail product container,
  wherein the products located in the internal storage volume of the first retail product container are blocked from view by the movable door;
  receiving first sensor information indicating that the customer is within the predetermined distance from the first retail product container, wherein the first sensor information comprises eye movement information of the customer;
  determining, from the received first sensor information, customer information about the customer;
  generating, based on the customer information, a selected advertisement that is appropriate for the customer;
  instructing, based on the customer information, the first retail product container to display the selected advertisement on a first display; and
  determining, based on the eye movement information, a success measure of the selected advertisement.

15. The method of claim 14, wherein the human form of the customer comprises a human face, the method further comprising:
  in response to the detecting, generating an opt-in invitation indication on the display of the first retail product container;
  receiving, by a communication interface of the first retail product container, a notification when the customer opts-in;
  in response to the receiving, interacting with the customer through an application executing on a communication device of the customer; and
  customizing a second advertisement on the display of the first retail product container based on preferences corresponding to the customer.

16. One or more non-transitory computer-readable media storing instructions that, when executed by one or more processors, cause the one or more processors to perform steps comprising:
  establishing communications with a first retail product container over a communications channel, wherein the first retail product container comprises:
    an internal storage volume;
    a movable door blocking a view of the internal storage volume;
    a first display affixed to the movable door, wherein the first display is configured to display at least a planogram of the internal storage volume; and
    a customer detector, wherein the customer detector is configured to detect a customer and receive sensor information associated the customer;
  instructing the first retail product container to display a full screen advertisement on the first display;
  receiving, from the first retail product container, an indication, via the customer detector, of a detection of a customer within a first predetermined distance from the first retail product container;
  instructing the first retail product container to terminate the full screen advertisement and to display a planogram of products located in the internal storage volume after receiving the indication;
  receiving, from the first retail product container and via the customer detector, first sensor information indicating that the customer is within the first predetermined distance from the first retail product container, wherein the first sensor information comprises eye movement information of the customer;
  determining, from the received first sensor information, customer information about the customer;
  generating, based on the customer information, a selected advertisement that is appropriate for the customer;
  instructing, based on the customer information, the first retail product container to display the selected advertisement on the first display; and
  determining, based on the eye movement information, a success measure of the selected advertisement.

17. The one or more non-transitory computer-readable media of claim 16, wherein the first display comprises a non-transparent display.

18. The one or more non-transitory computer-readable media of claim 16, wherein the instructions, when executed by the one or more processors, cause the one or more processors to perform steps comprising:
   receiving, from the first retail product container, information on a number of customers viewing the selected advertisement; and
   determining a level of effectiveness of the selected advertisement based on the number of customers.

19. The one or more non-transitory computer-readable media of claim 16, wherein the instructions, when executed by the one or more processors, cause the one or more processors to perform steps comprising:
   determining a first product type stored in the first retail product container, and a second product type stored in a second retail product container, wherein the first product type is different from the second product type;
   downloading a first set of files associated with the first product type, and a second set of files associated with the second product type, wherein the first set of files includes a first plurality of files, wherein the second set of files includes a second plurality of files, and wherein each file of the first set of files or of the second set of files corresponds to an associated advertisement;
   initiating, from the first set of files, a first advertisement on the first display at the first retail product container; and
   initiating, from the second set of files, a second advertisement on a second display at the second retail product container, wherein the second advertisement is different from the first advertisement.

20. The one or more non-transitory computer-readable media of claim 19, wherein the instructions, when executed by the one or more processors, cause the one or more processors to perform steps comprising:
   determining the first product type based on a first identification information of the first retail product container; and
   determining the second product type based on a second identification information of the second retail product container.

* * * * *